US010515481B2

(12) United States Patent
Sawaki et al.

(10) Patent No.: US 10,515,481 B2
(45) Date of Patent: Dec. 24, 2019

(54) METHOD FOR ASSISTING MOVEMENT IN VIRTUAL SPACE AND SYSTEM EXECUTING THE METHOD

(71) Applicant: COLOPL, Inc., Tokyo (JP)

(72) Inventors: Kazuaki Sawaki, Tokyo (JP); Takashi Nakabo, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/887,602

(22) Filed: Feb. 2, 2018

(65) Prior Publication Data
US 2018/0247454 A1    Aug. 30, 2018

(30) Foreign Application Priority Data
Feb. 3, 2017    (JP) .................. 2017-018576

(51) Int. Cl.
*G06T 19/00*    (2011.01)
*G06T 15/20*    (2011.01)
(Continued)

(52) U.S. Cl.
CPC ........ *G06T 19/003* (2013.01); *G02B 27/0093* (2013.01); *G02B 27/017* (2013.01);
(Continued)

(58) Field of Classification Search
CPC .............. G06T 19/003; G02B 27/0093; G02B 27/017; G02B 27/0172; G06F 1/163
(Continued)

(56) References Cited

U.S. PATENT DOCUMENTS 3,678,283 A * 7/1972 LaBaw .................. F41G 3/225
                                                  250/216
2013/0249947 A1* 9/2013 Reitan ..................... G06F 3/011
                                                  345/633
(Continued)

FOREIGN PATENT DOCUMENTS

JP    2000-244886 A    9/2000
JP    2012-53643 A     3/2012
JP    5914739 B1       5/2016

OTHER PUBLICATIONS

"Experience will change to this with a single line of sight. VR headset with eye tracking system "FOVE"", Online, Searched Jan. 8, 2017, Ineternet, https://www.gizmodo.jp/2016/09/tgs2016-vr-fove.html, 10pp.
(Continued)

*Primary Examiner* — Sarah Lhymn
(74) *Attorney, Agent, or Firm* — Hauptman Ham, LLP

(57) ABSTRACT

A method includes defining a virtual space including a virtual point of view associated with a first user and, a first and second object. The method includes defining a field of view based on a position of the virtual point of view and a detected motion of the user. The method includes generating a field-of-view image corresponding to the field of view. The method includes displaying the first object in a first mode; and displaying the second object in a second mode. The method includes detecting a position of gaze of the first user. The method includes detecting contact between the position of gaze and the first object. The method includes displaying the first or second object in a third mode in response to detection of the contact. The method includes moving the position of the virtual point of view to the first object in response to detection of the contact.

20 Claims, 28 Drawing Sheets

(51) Int. Cl.
| | |
|---|---|
| *G06F 3/0482* | (2013.01) |
| *G06F 3/01* | (2006.01) |
| *G02B 27/01* | (2006.01) |
| *G06F 3/0481* | (2013.01) |
| *G06F 1/16* | (2006.01) |
| *G09G 5/00* | (2006.01) |
| *G06F 3/0346* | (2013.01) |
| *G02B 27/00* | (2006.01) |

(52) U.S. Cl.
CPC ......... *G02B 27/0172* (2013.01); *G06F 1/163* (2013.01); *G06F 3/011* (2013.01); *G06F 3/012* (2013.01); *G06F 3/014* (2013.01); *G06F 3/0346* (2013.01); *G06F 3/0482* (2013.01); *G06F 3/04815* (2013.01); *G06T 15/20* (2013.01); *G09G 5/00* (2013.01); *G02B 2027/014* (2013.01); *G02B 2027/0134* (2013.01); *G02B 2027/0138* (2013.01); *G09G 2320/0261* (2013.01)

(58) Field of Classification Search
USPC .................................................. 345/418, 419
See application file for complete search history.

(56) References Cited

U.S. PATENT DOCUMENTS

| | | | | |
|---|---|---|---|---|
| 2013/0304479 | A1* | 11/2013 | Teller | G06F 3/013 704/275 |
| 2014/0327666 | A1* | 11/2014 | Suzuki | G06T 19/006 345/419 |
| 2015/0123997 | A1* | 5/2015 | Hayasaka | G02B 27/017 345/633 |

OTHER PUBLICATIONS

Office Action in JP Application No. 2017-018576, dated Oct. 10, 2017, 8pp.

Koji Yumoto et al., "A Visualization Technique for Supporting Joint Attention in a Collaborative Virtual Environment", IEICE Technical Report, vol. 108 No. 226, The Institute of Electronics, Information and Communication Engineers, Sep. 25, 2008, pp. 79-84, Japan, 6pp.

Notice of Allowance in JP Application No. 2017-018576, dated Dec. 19, 2017, 5pp.

* cited by examiner

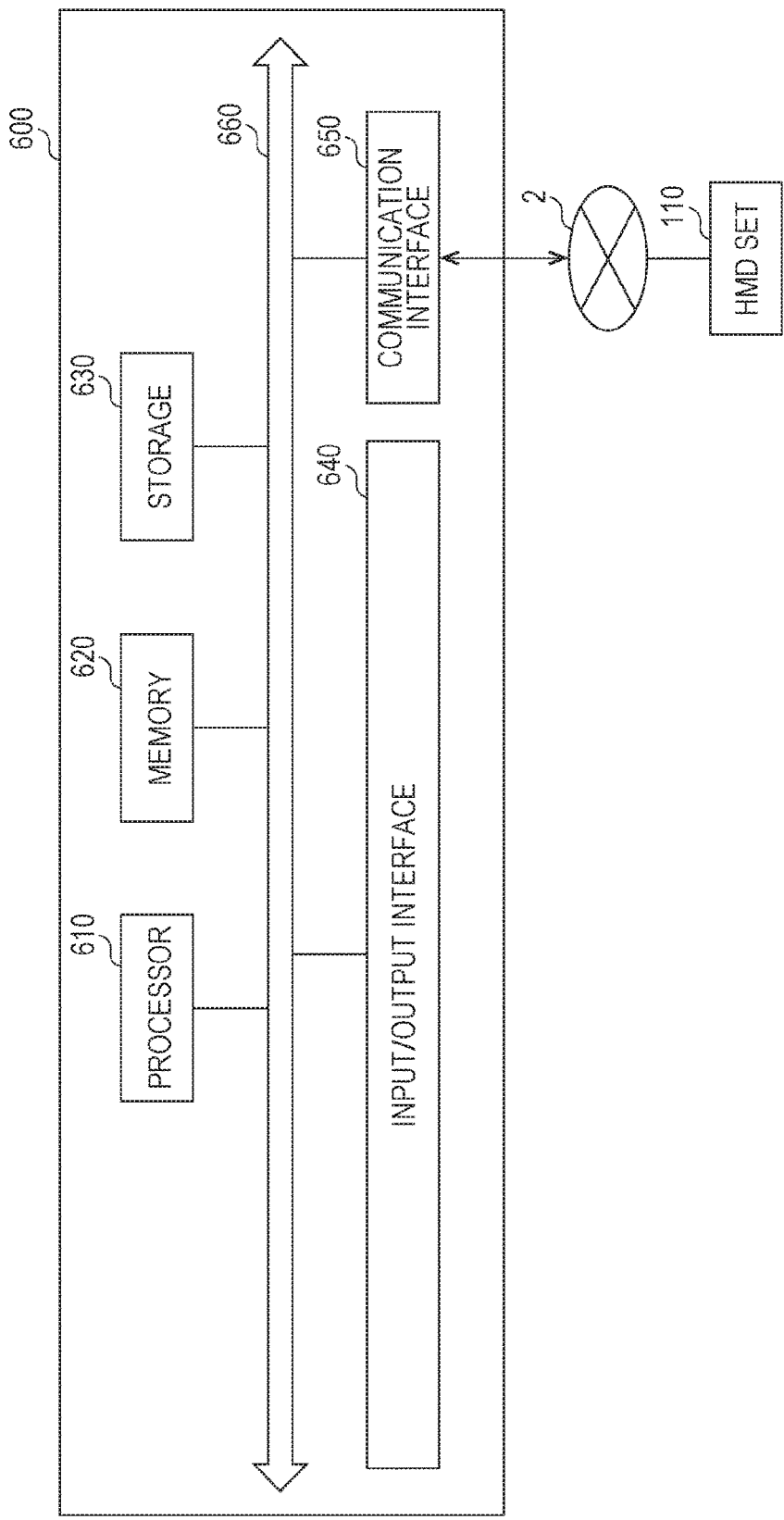

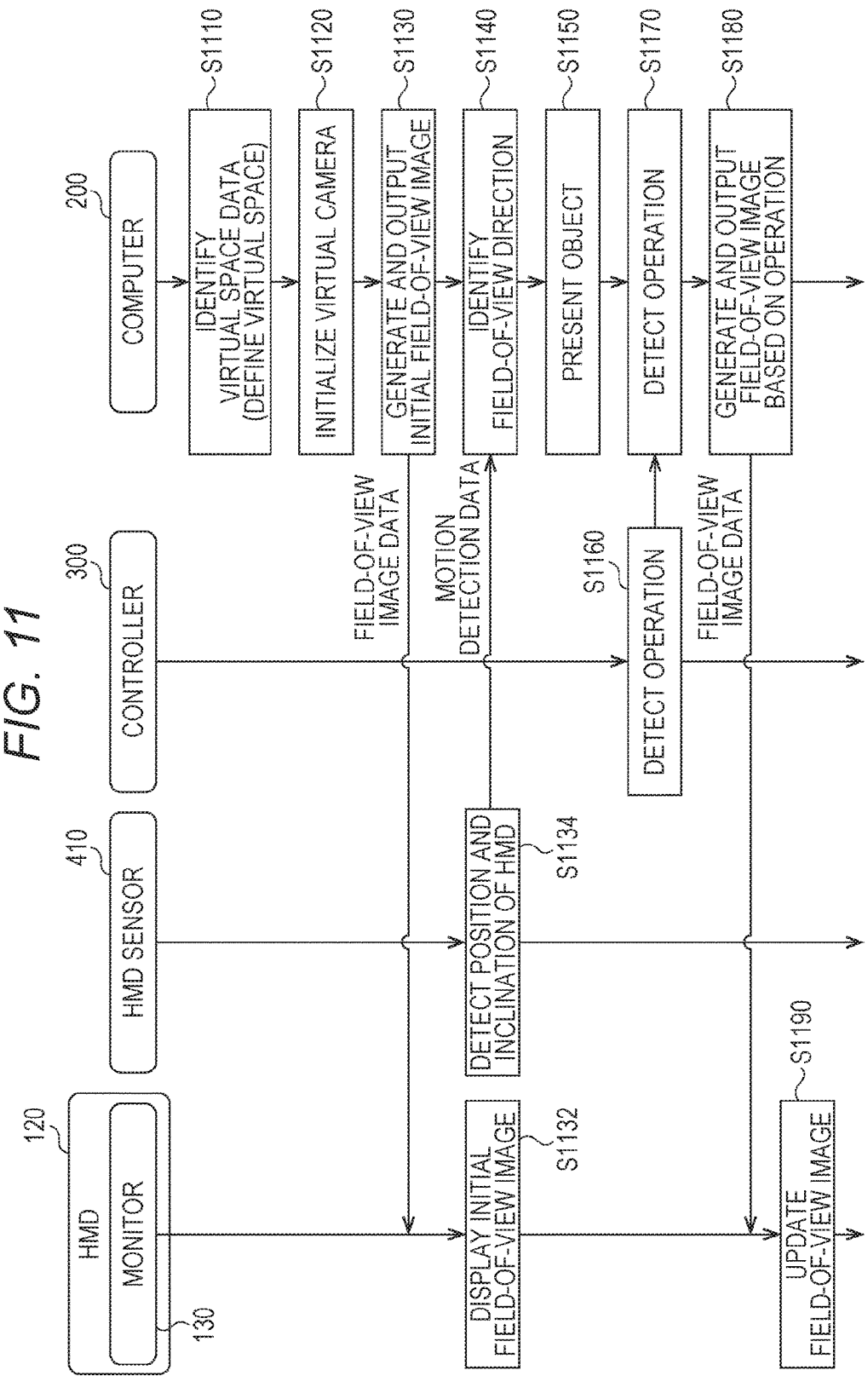

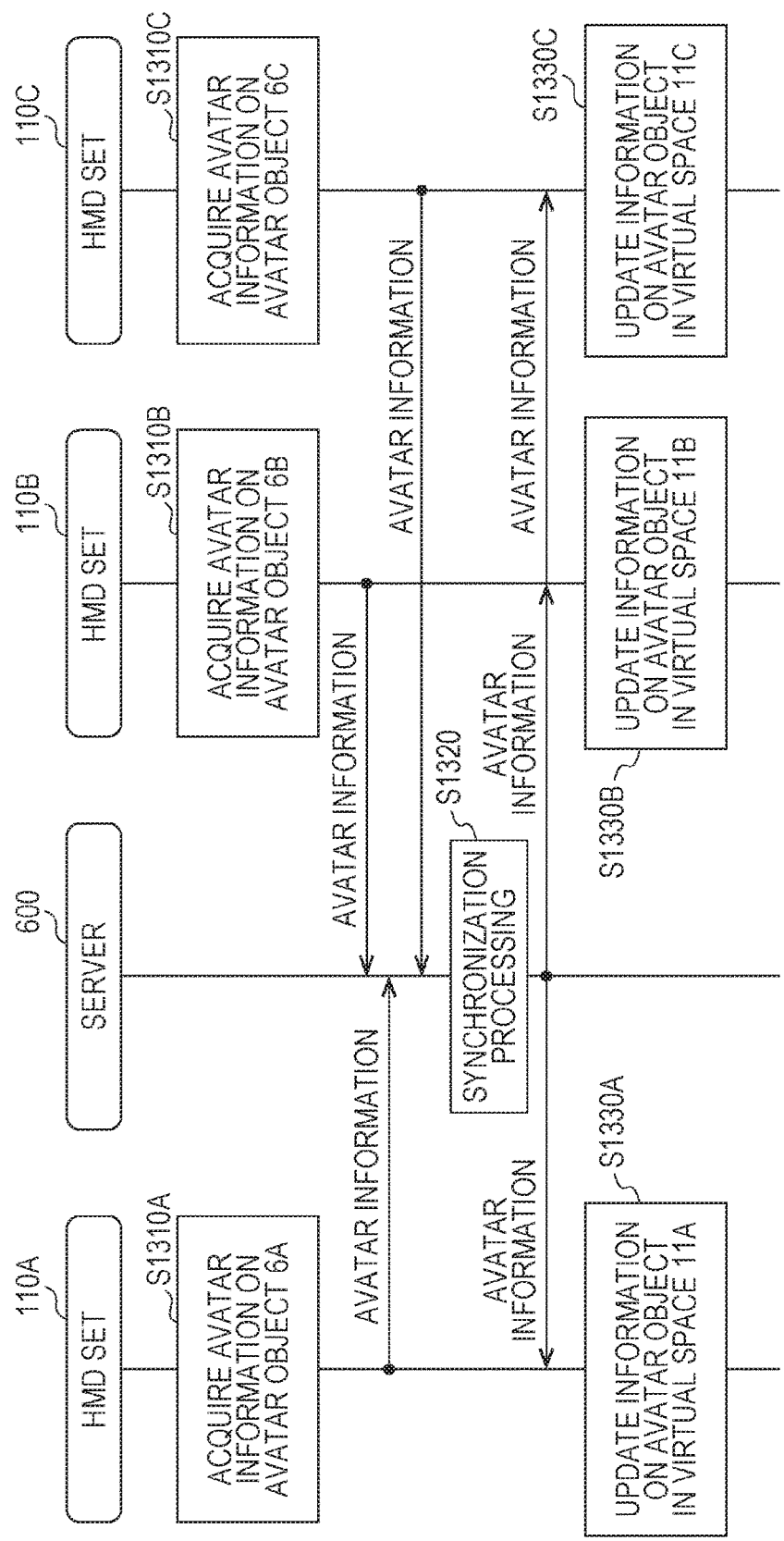

*FIG. 15*

| | POSITION | | | SIZE | | |
|---|---|---|---|---|---|---|
| | X | Y | Z | X | Y | Z |
| OBJECT FOR MOVEMENT | X1 | Y1 | Z1 | 20 | 20 | 5 |
| OBJECT FOR MOVEMENT | X1 | Y1 | Z1 | 20 | 20 | 5 |
| SEAT OBJECT | X2 | Y2 | Z2 | 25 | 25 | 50 |
| ⋮ | ⋮ | ⋮ | ⋮ | ⋮ | ⋮ | ⋮ |

1432

METHOD FOR ASSISTING MOVEMENT IN VIRTUAL SPACE AND SYSTEM EXECUTING THE METHOD

RELATED APPLICATIONS

The present application claims priority to Japanese application No. 2017-018576, filed Feb. 3, 2017, the disclosure of which is hereby incorporated by reference herein in its entirety.

TECHNICAL FIELD

This disclosure relates to a technology for providing a virtual space, and more particularly, to a technology for assisting movement in a virtual space.

BACKGROUND

There is known a technology of providing a virtual space with use of a head-mounted device (HMD). There are proposed various technologies for achieving operations performed by a user in a virtual space.

For example, in Non-Patent Document 1, there is described a technology for aligning a sight with a target object through use of the line of sight of a user in a shooter game in a virtual space.

Non-Patent Documents

[Non-Patent Document 1] "A single line of sight changes experience even this far. "FOVE", the VR headset mounted with an eye tracking system", [online], [retrieved on Jan. 8, 2017], the Internet <URL: http://www.gizmodo.jp/2016/09/tgs2016-vr-fove.html>

SUMMARY

According to at least one embodiment of this disclosure, there is provided a method including defining a virtual space. The method further includes arranging a virtual point of view associated with a first user and a first object in the virtual space. The method further includes defining a field of view from the virtual point of view; detecting a motion of a head of the first user. The method further includes controlling a direction of the field of view based on the motion. The method further includes generating a field-of-view image corresponding to the field of view. The method further includes detecting a position of gaze of the first user in the field of view. The method further includes detecting contact between the position of gaze and the first object. The method further includes changing a display mode of the first object in response to detection of the contact. The method further includes defining a first time period; detecting that the contact has been maintained for the first time period. The method further includes moving a position of the virtual point of view to a position of the first object in response to detection that the contact has been maintained for the first time period.

The above-mentioned and other objects, features, aspects, and advantages of the disclosure may be made clear from the following detailed description of this disclosure, which is to be understood in association with the attached drawings.

BRIEF DESCRIPTION OF THE DRAWINGS

FIG. 9 A block diagram of a hardware configuration of a server according to at least one embodiment of this disclosure.

FIG. 11 A sequence chart of processing to be executed by a system including an HMD set according to at least one embodiment of this disclosure.

FIG. 13 A sequence diagram of processing to be executed by a system including an HMD interacting in a network according to at least one embodiment of this disclosure.

FIG. 15 A table of a data structure of object information according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
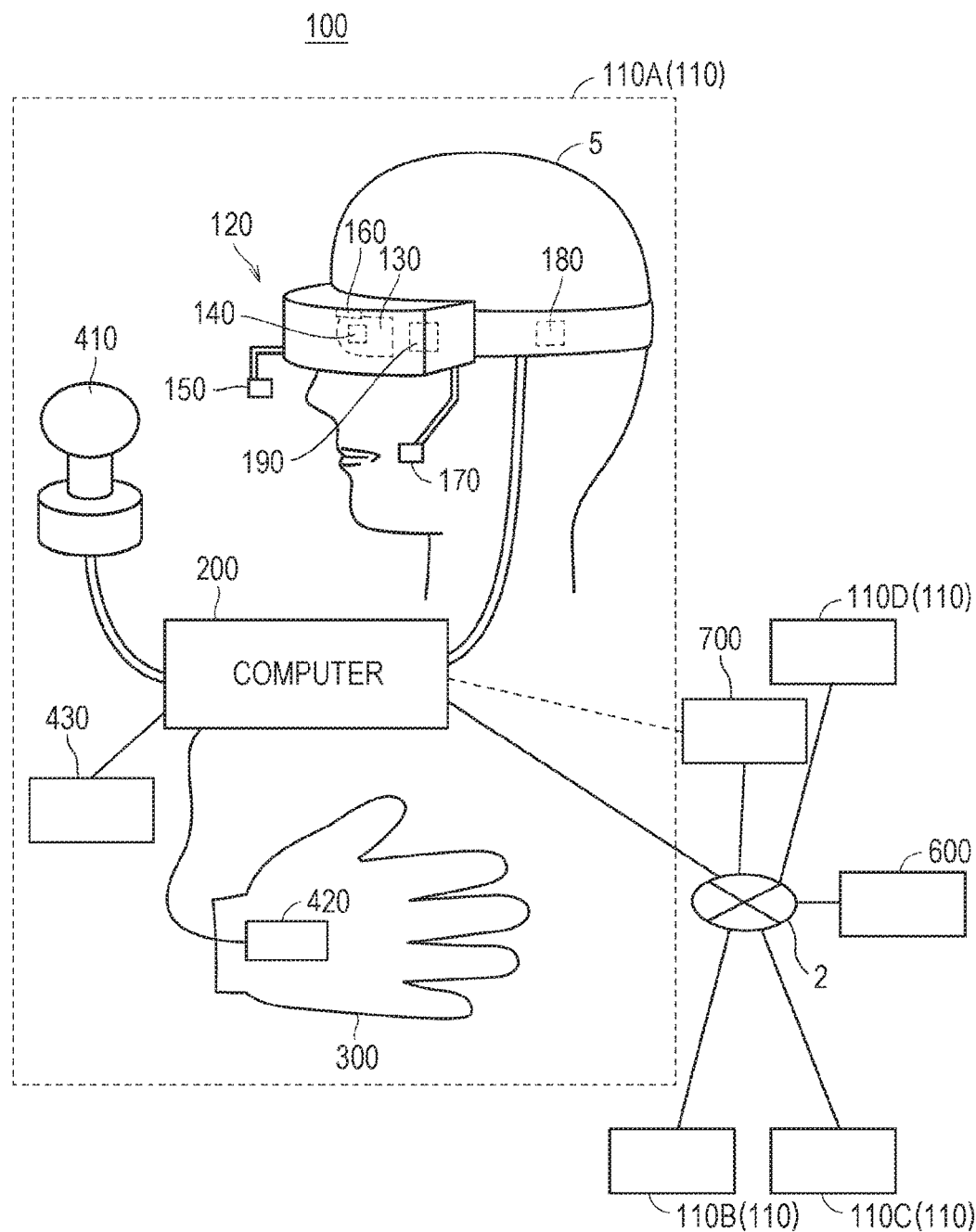
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to)

the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive a reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
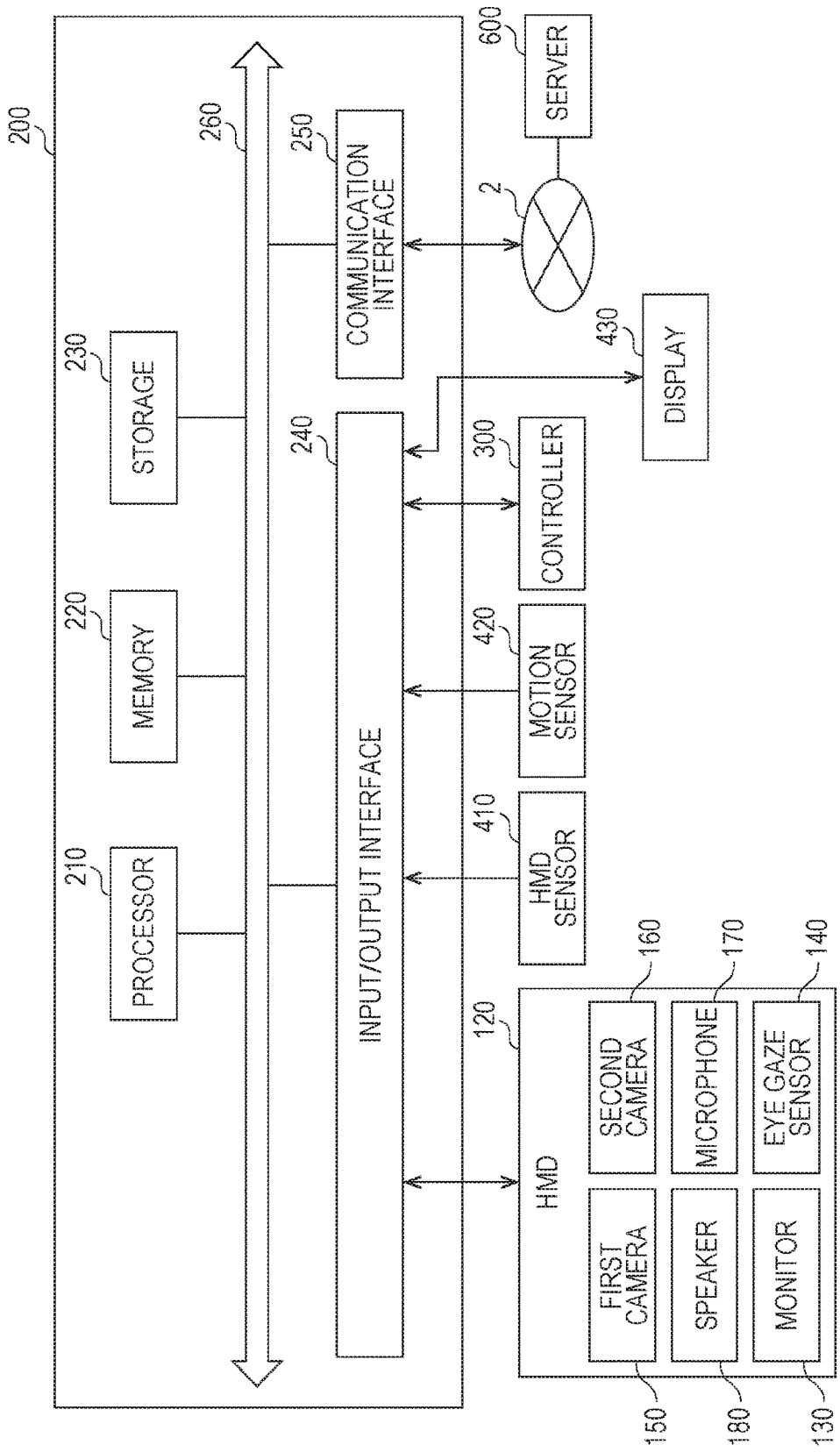
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth (R), near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
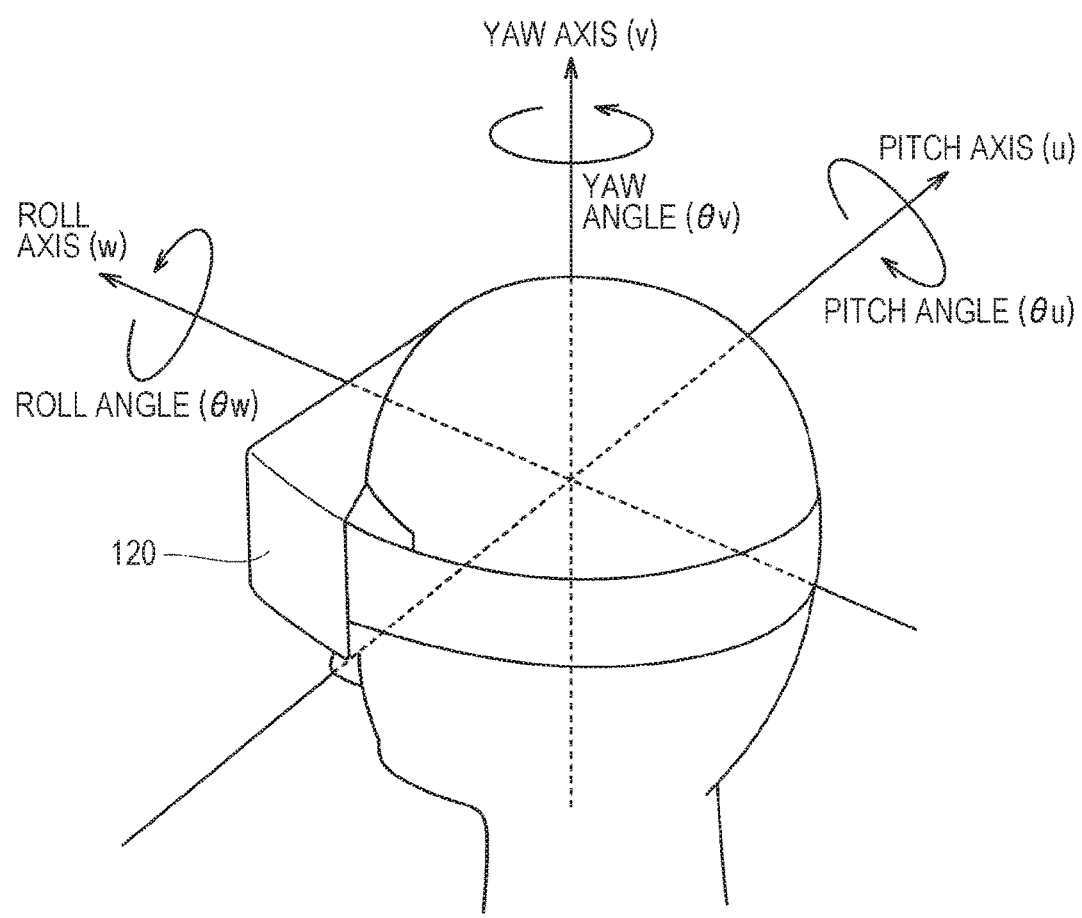
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle ($\theta v$), and a roll angle ($\theta w$) of the HMD 120 in the uvw visual-field coordinate system. The pitch angle ($\theta u$) represents an inclination angle of the HMD 120 about the pitch axis in the uvw visual-field coordinate system. The yaw angle ($\theta v$) represents an inclination angle of the HMD 120 about the yaw axis in the uvw visual-field coordinate system. The roll angle ($\theta w$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
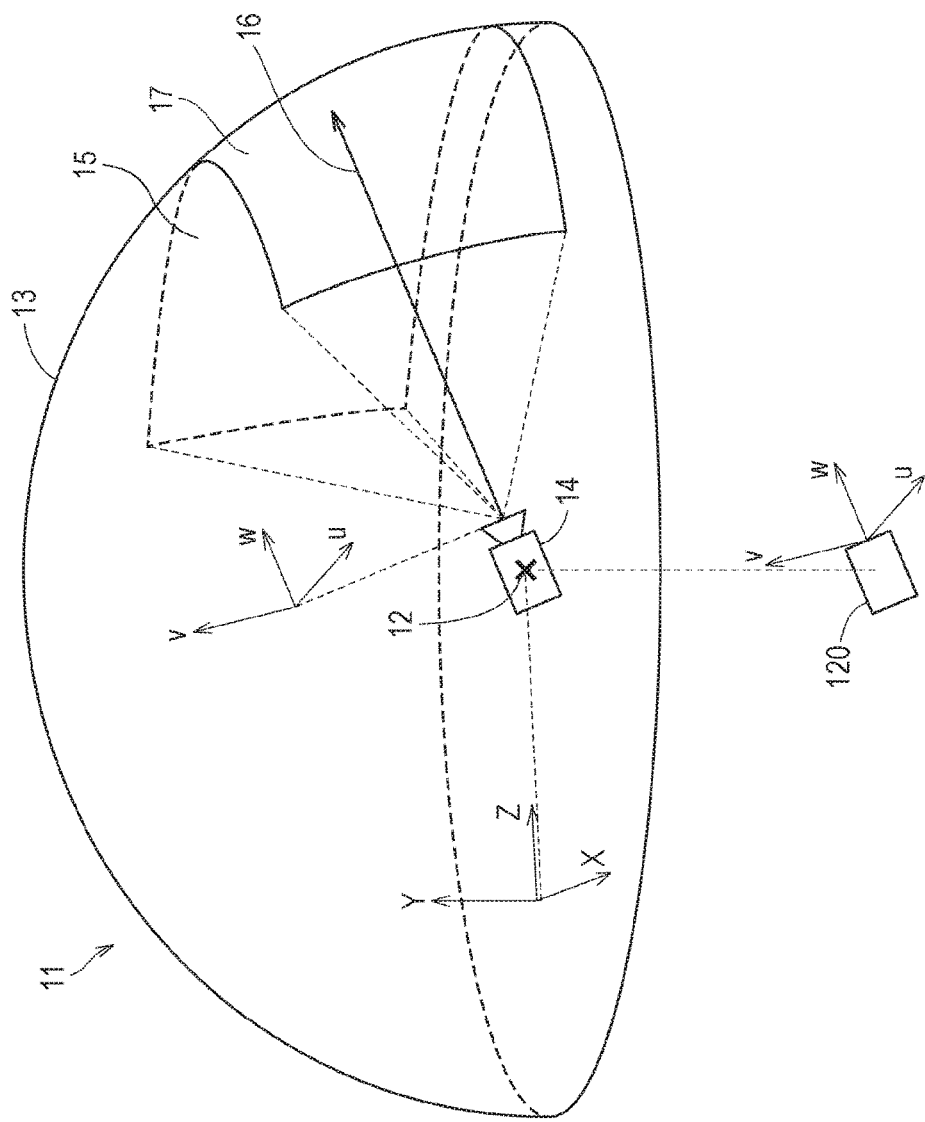
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
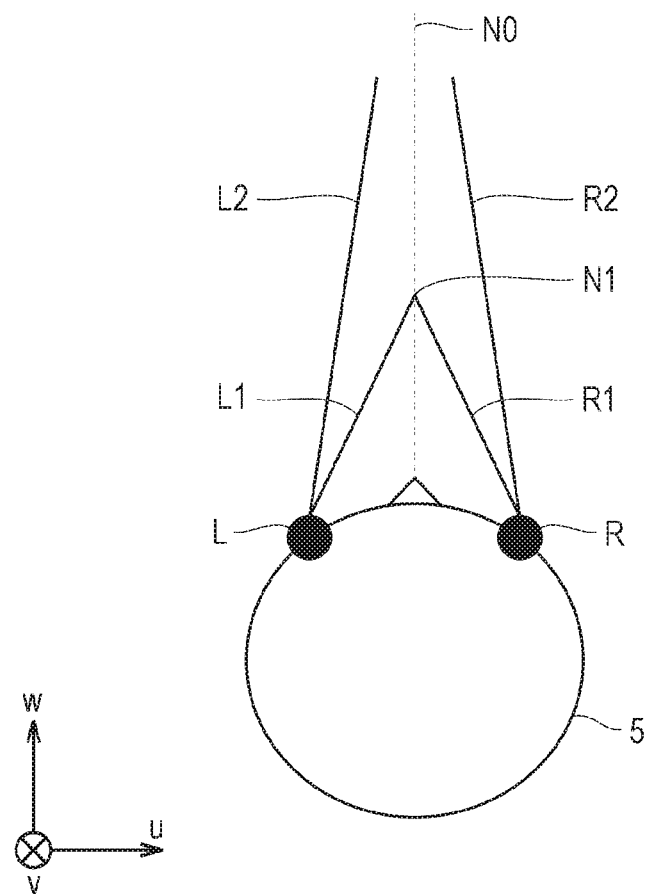
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
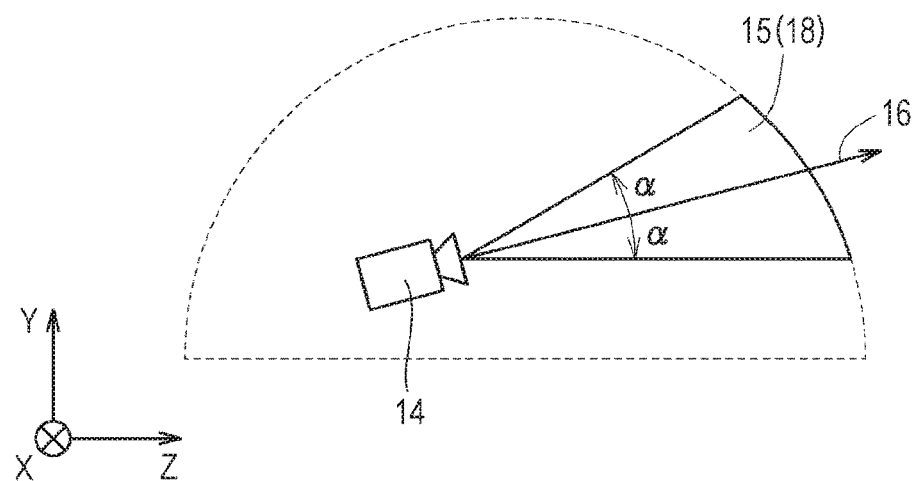
FIG. 6 A diagram of a YZ cross section obtained by viewing a field-of-view region from an X direction in the virtual space according to at least one embodiment of this disclosure.
Figure 7:
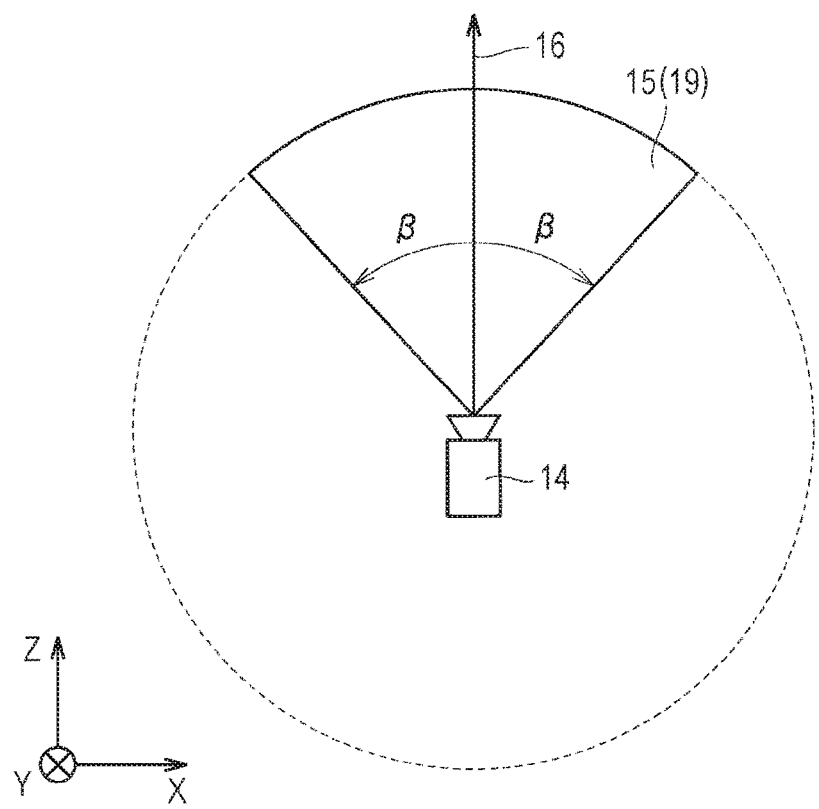
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
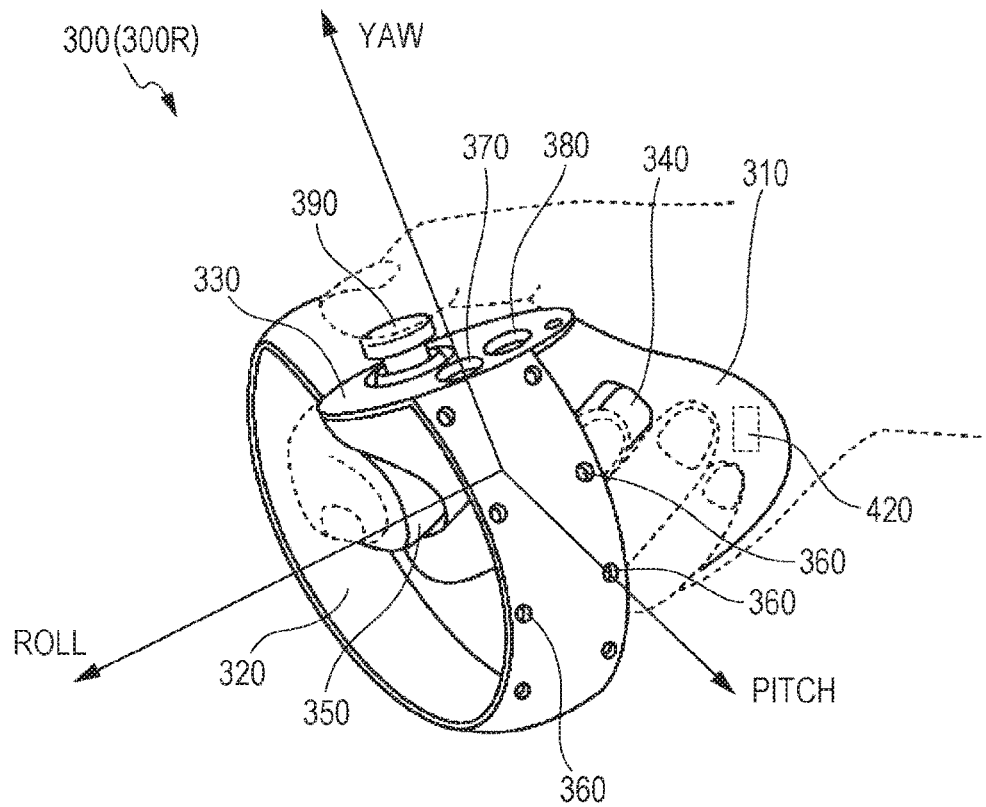
FIG. 8A A diagram of a schematic configuration of a controller according to at least one embodiment of this disclosure.
Figure 8B:
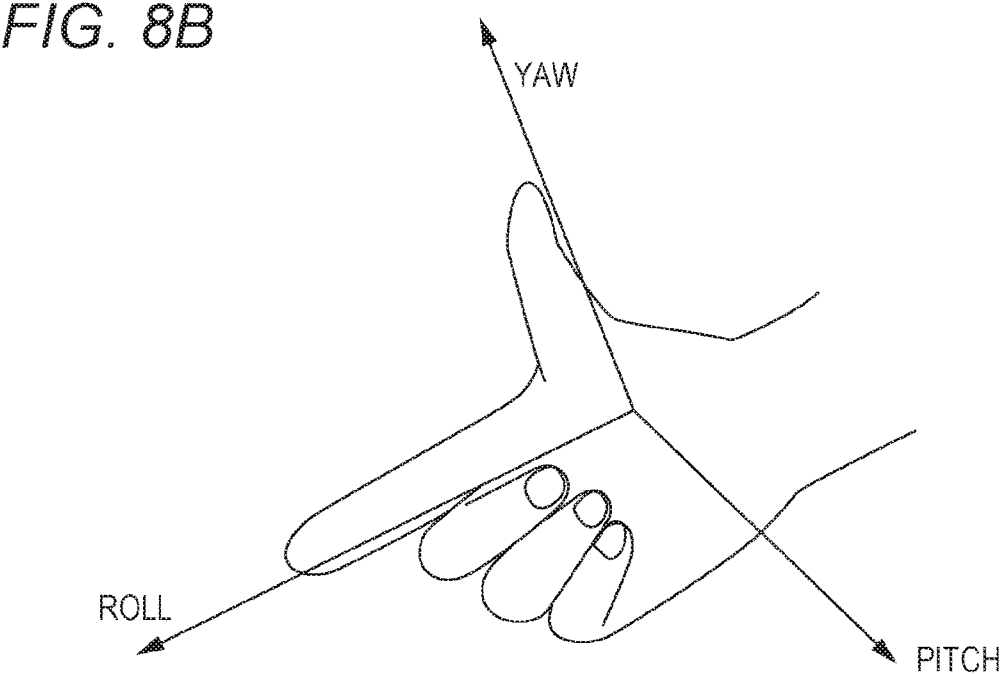
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity.

The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIGS. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
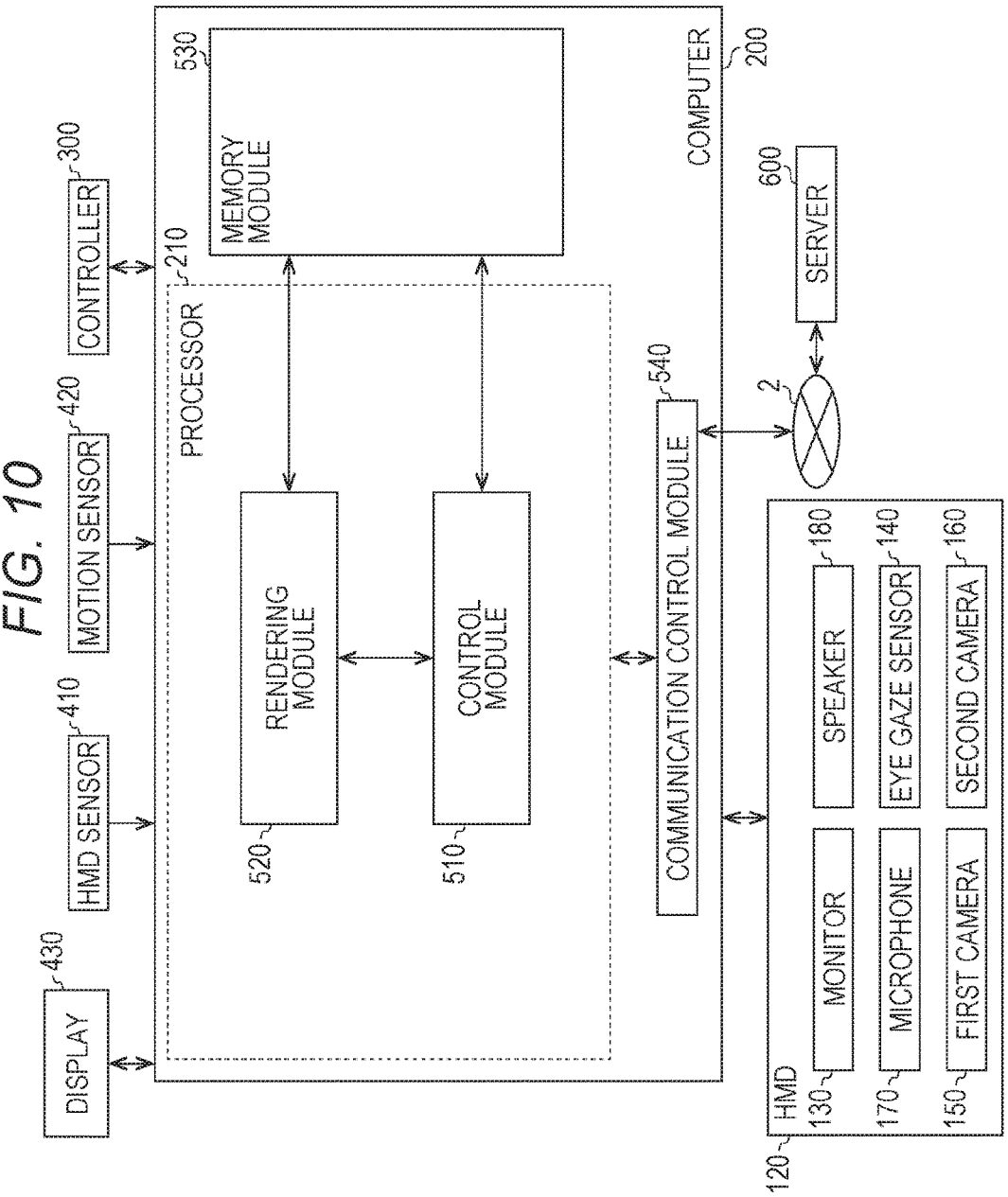
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity (R) provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
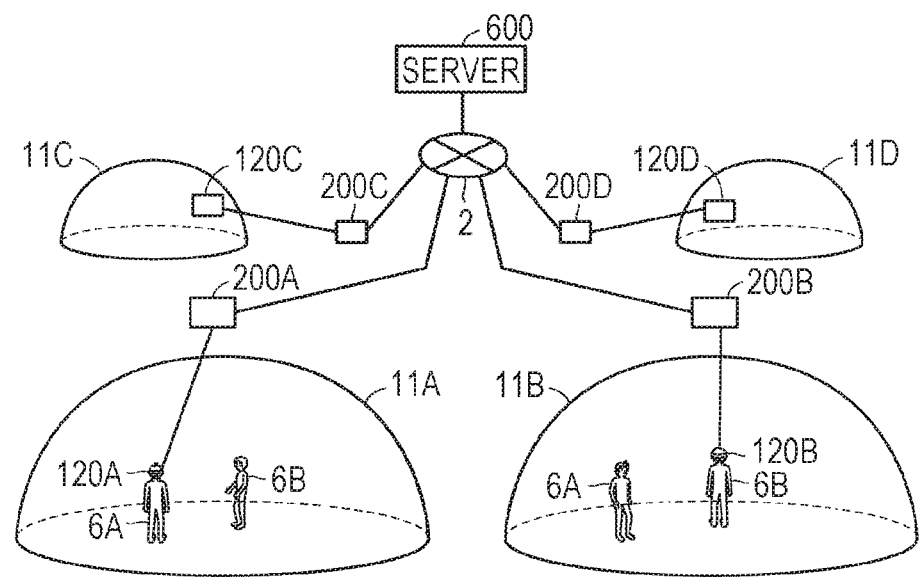
FIG. 12A A schematic diagram of HMD systems of several users sharing the virtual space interact using a network according to at least one embodiment of this disclosure.
Figure 12B:
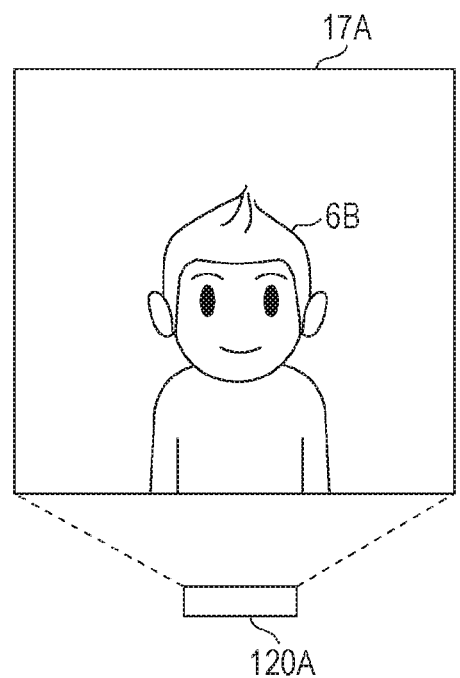
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Details of Module Configuration]

Figure 14:
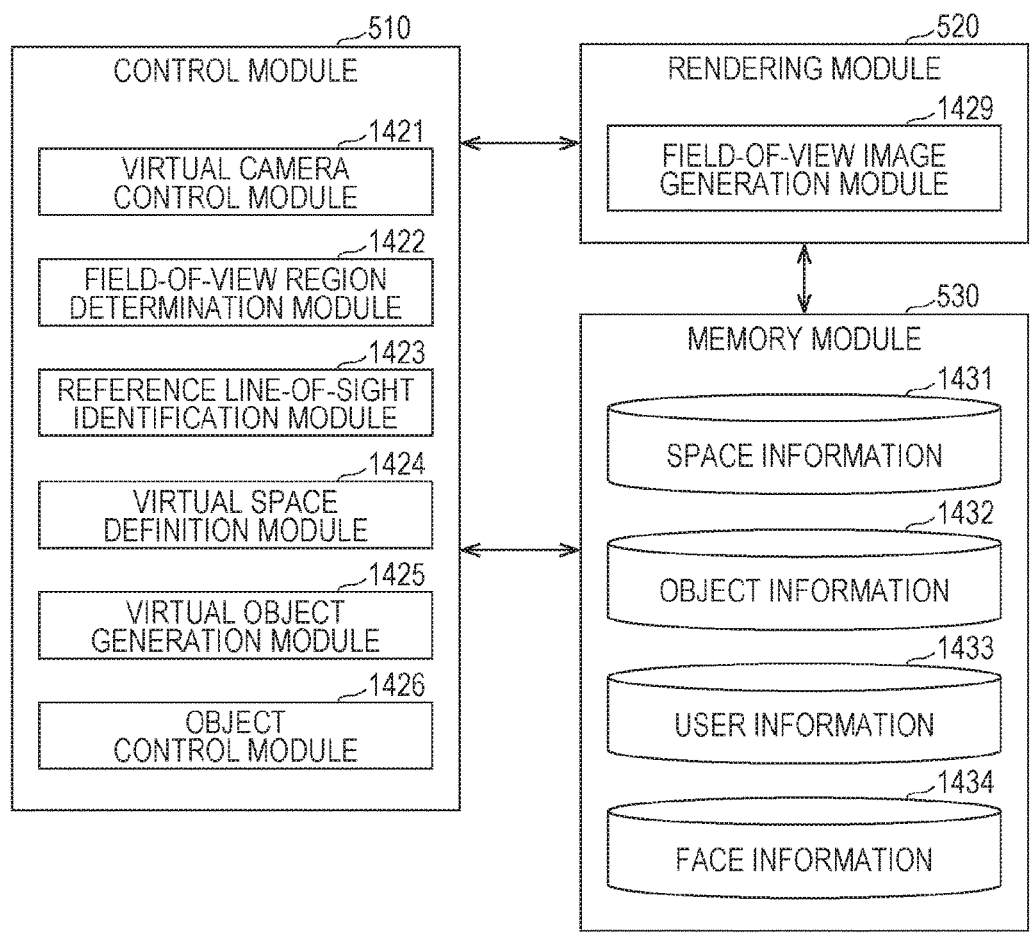
FIG. 14 A block diagram of a configuration of modules of the computer according to at least one embodiment of this disclosure.

With reference to FIG. 14, a module configuration of the computer 200 is described. FIG. 14 is a block diagram of a configuration of modules of the computer according to at least one embodiment of this disclosure.

In FIG. 14, the control module 510 includes a virtual camera control module 1421, a field-of-view region determination module 1422, a reference line-of-sight identification module 1423, a virtual space definition module 1424, a virtual object generation module 1425, and an object control module 1426. The rendering module 520 includes a field-of-view image generation module 1429. The memory module 530 stores space information 1431, object information 1432, and user information 1433, and face information 1434.

The control module 510 controls image display on the monitor 130 of the HMD 120. The virtual camera control module 1421 arranges the virtual camera 14 in the virtual space 11. The virtual camera control module 1421 controls a position of the virtual camera 14 in the virtual space 11 and the inclination (direction) of the virtual camera 14. The field-of-view region determination module 1422 determines the field-of-view region 15 based on the inclination of the HMD 120 (i.e., output of sensor 114) and the position of the virtual camera 14. The field-of-view image generation module 1429 generates the field-of-view image 17 to be displayed on the monitor 130 based on the determined field-of-view region 15.

The reference line-of-sight identification module 1423 identifies the inclination of the HMD 120 based on the output from the sensor 190 or the HMD sensor 410. The reference line-of-sight identification module 1423 identifies the line-of-sight of the user 5 based on the signal from the eye gaze sensor 140.

The control module 510 controls the virtual space 11 provided to the user 5. The virtual space definition module 1424 generates virtual space data representing the virtual space 11, to thereby define the virtual space 11 in the system 100.

The virtual object generation module 1425 generates objects to be arranged in the virtual space 11. The objects may include, for example, forests, mountains, other landscapes, and animals to be arranged in accordance with the progression of the story of the game. The object includes an object for movement, which functions as a trigger for the movement of a viewpoint of the user 5 (namely, position of the virtual camera 14) in the virtual space 11.

The object control module 1426 controls, for example, the motion of the object arranged in the virtual space 11. For example, the object control module 1426 controls the motion of the avatar object described later.

The space information 1431 stores one or more templates that are defined to provide the virtual space 11.

The object information 1432 stores content to be reproduced in the virtual space 11, objects to be used in the content, and information (e.g., positional information) for arranging objects in the virtual space 11.

FIG. 15 is a table of a data structure of the object information 1432 according to at least one embodiment of this disclosure. The object information 1432 in FIG. 15 stores, for each object, the position of the object arranged in the virtual space 11 and the dimensions of the object in three-axis (XYZ) directions in association with each other. In at least one aspect, the object information 1432 further stores data for modeling the object in association with the above-mentioned pieces of information.

Referring again to FIG. 14, the user information 1433 stores a program for causing the computer 200 to function as the control apparatus of the system 100, application programs using the various content stored in the object information 1432, and the like.

[Movement in Virtual Space Through Use of Object for Movement]

Figure 16:
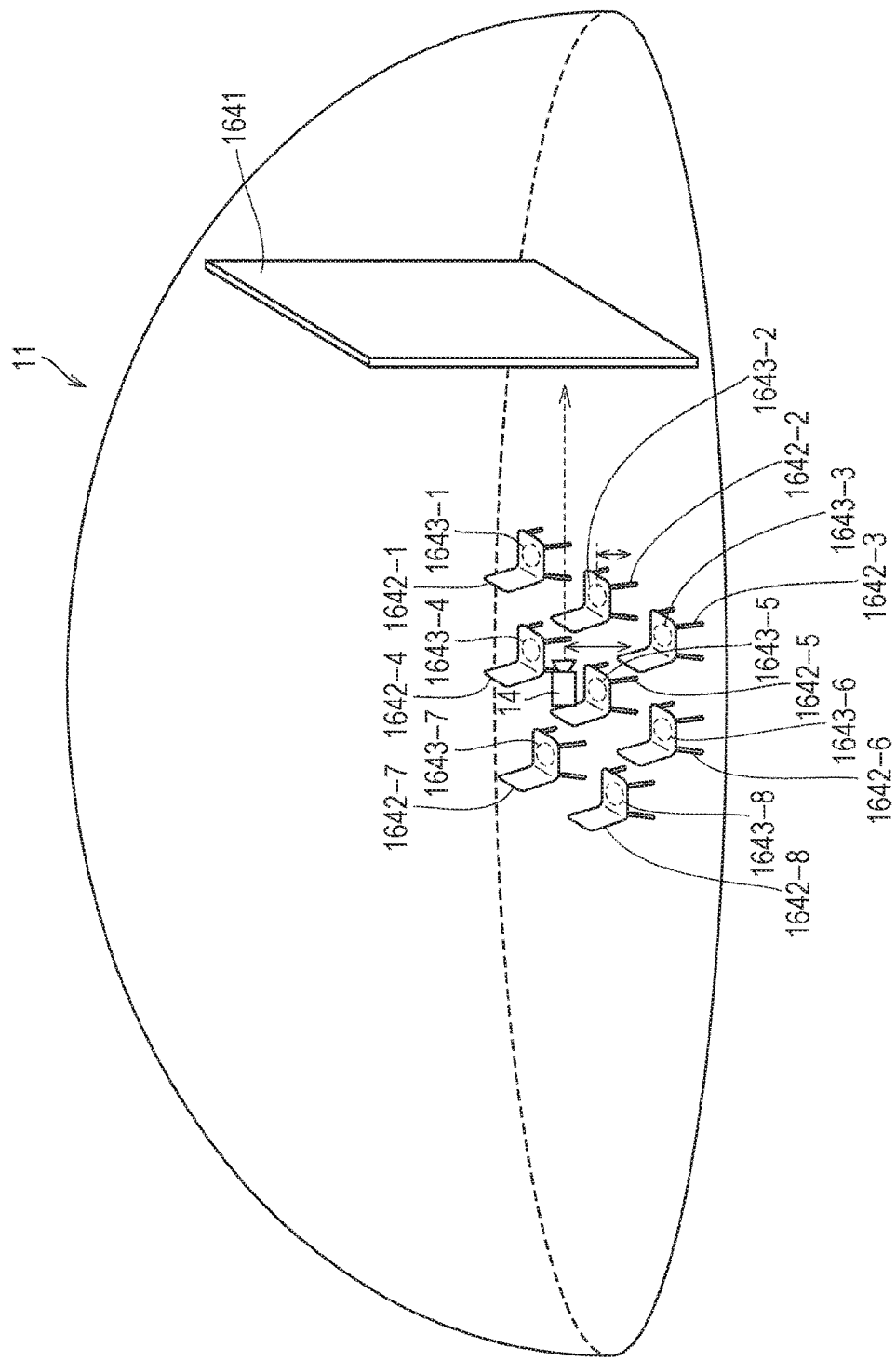
FIG. 16 A diagram of a structure of a virtual space in at least one embodiment of this disclosure.

With reference to FIG. 16 to FIG. 22, control for moving the position of the virtual camera 14 (namely, viewpoint of the user 5) through use of the object for movement is described. FIG. 16 is a diagram of a structure of the virtual space 11 in at least one aspect.

In the virtual space 11 in FIG. 16, a virtual movie theater is formed. More specifically, the virtual space 11 includes a screen object 1641, seat objects 1642-1, 1642-2, . . . , and 1642-8, objects 1643-1, 1643-2, . . . , and 1643-8 for movement, and the virtual camera 14. In the following description, the seat object 1642-1, 1642-2, . . . , and 1642-8 are collectively referred to as "seat object 1642", and the objects 1643-1, 1643-2, . . . , and 1643-8 for movement are collectively referred to as "object 1643 for movement". The object 1643 for movement is arranged on a seat surface of the seat object 1642.

In at least one aspect, an initial position 12 at which the virtual camera 14 in an initial state is arranged is a position above the seat object 1642-5 (in the Y direction). The virtual camera 14 is arranged so as to be directed toward the screen object 1641.

Figure 17:
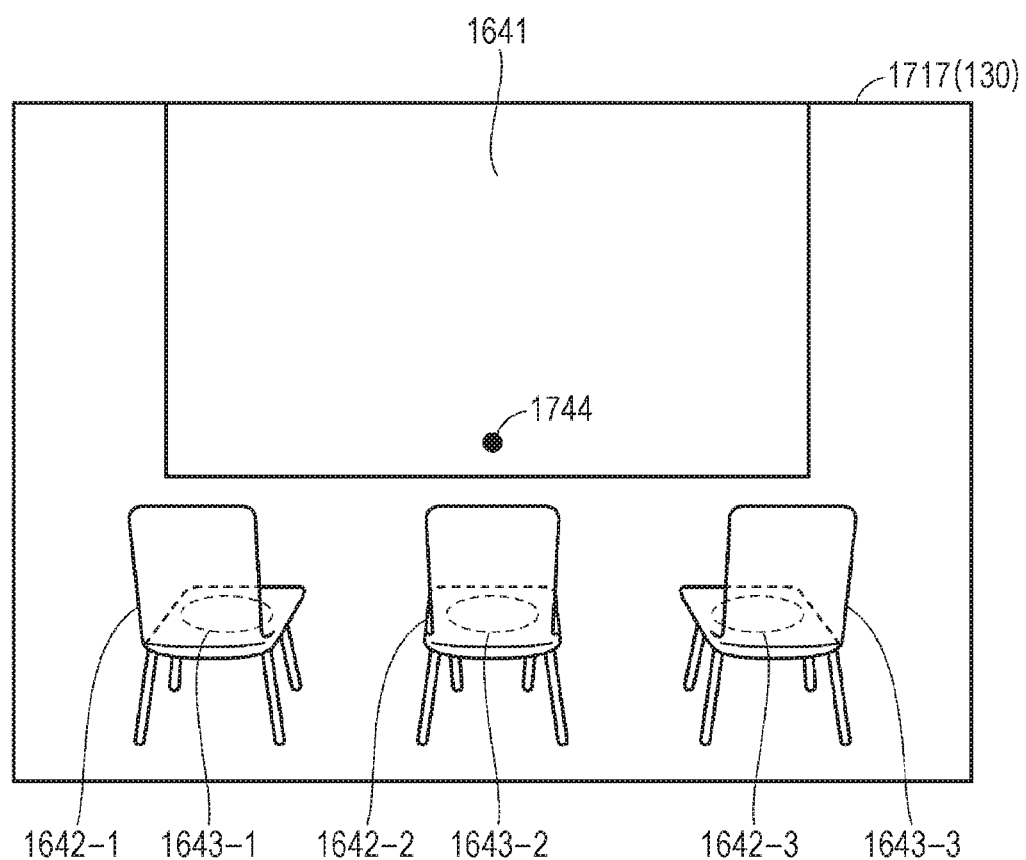
FIG. 17 A diagram of a field-of-view image from a virtual camera according to at least one embodiment of this disclosure.
Figure 18:
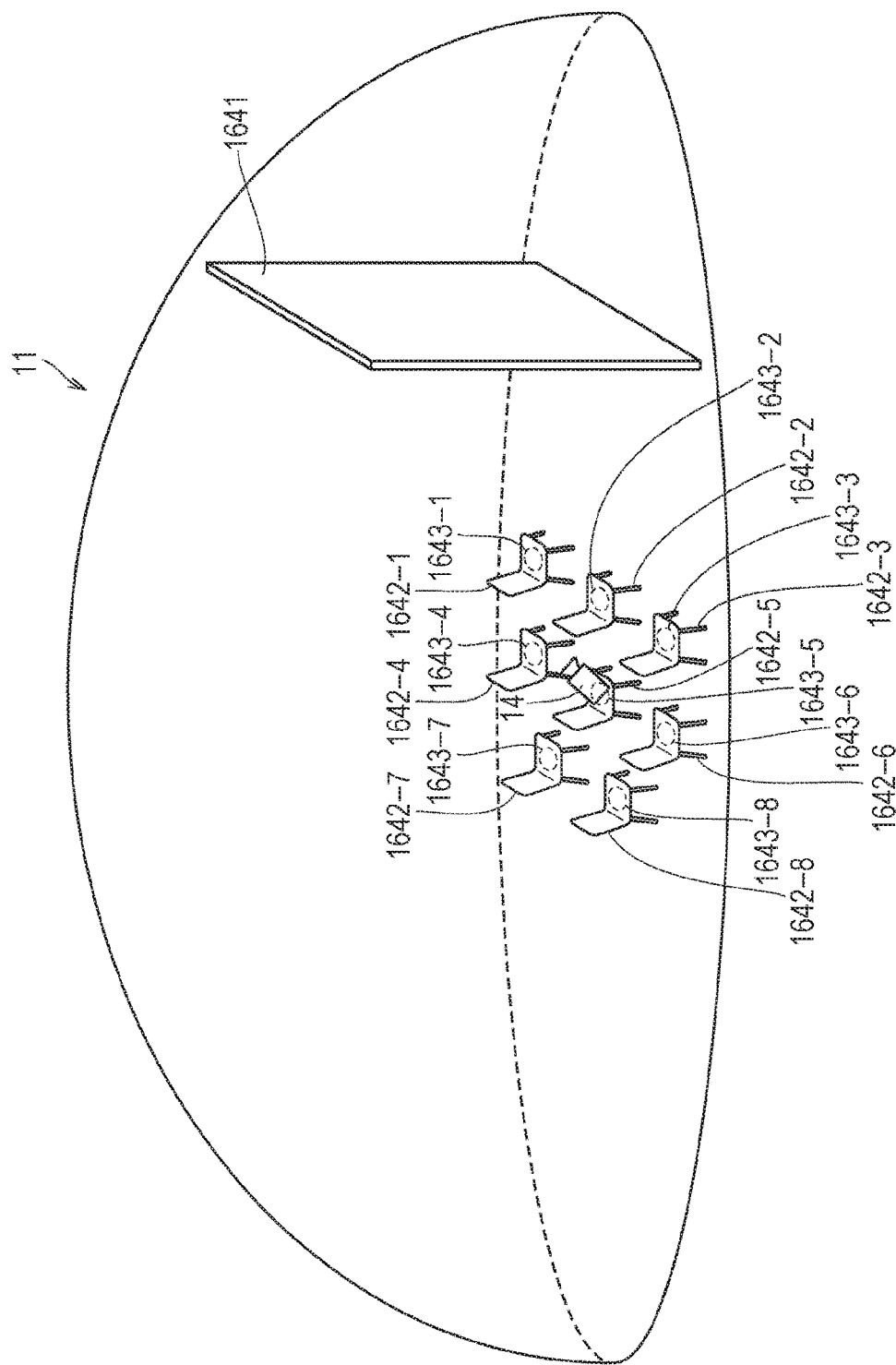
FIG. 18 A diagram of a structure of the virtual space in at least one embodiment of this disclosure.

FIG. 17 is a diagram of a field-of-view image 1200 from the virtual camera 14 of FIG. 16 according to at least one embodiment of this disclosure. A field-of-view image 1717 includes the seat objects 1642-1, 1642-2, and 1642-3 and the screen 1641. The screen object 1641 is configured to enable the reproduction of content (for example, still image or moving image) distributed from the server 600 or content stored in the storage 230. The user 5 can view the content projected on the screen 1641 in the virtual space 11.

The field-of-view image 1717 further includes a marker 1744. The marker 1744 is arranged at the center of the field-of-view image. In FIG. 6 and FIG. 7, the field-of-view region 15 is described as being a predetermined range from the reference line of sight 16 serving as the center in the virtual space 11. The field-of-view image is the panoramic image 13 corresponding to the field-of-view region 15. Therefore, the marker 1744 displayed at the center of the field-of-view image corresponds to the position indicated by the reference line of sight 16. In at least one embodiment, the computer 200 handles the marker 1744 as a position (point of gaze) at which the line of sight of the user 5 is set in the virtual space 11.

With reference back to FIG. 16, there is a case in which the user 5 wishes to move from the seat object 1642-5 to the position of another seat object 1642. In such a case, the user 5 gazes at the object 1643 for movement corresponding to another seat object 1642. When detecting that the object 1643 for movement has been gazed at by the user 5 for a predetermined time period (for example, two seconds), the computer 200 moves the virtual camera 14 (viewpoint of the user 5) to the position of the object 1643 for movement that has been gazed at.

The computer 200 detects that the object 1643 for movement has been gazed at by the user 5 in response to detection that the marker 1744 has moved to be superimposed on the object 1643 for movement, that is, in response to detection that the object 1643 for movement has entered to be included in the central part of the field of view of the user 5 in the virtual space 11. The computer 200 can detect that the marker 1744 has moved to be superimposed on the object 1643 for movement in response to detection that the vector of the reference line of sight 16 has penetrated a spatial region occupied by the object 1643 for movement. The spatial region occupied by the object 1643 for movement is defined by the object information 1432 described, for example, with reference to FIG. 15.

In at least one embodiment, when detecting that the object 1643 for movement has been gazed at by the user 5, the computer 200 changes a display mode of the object 1643 for movement. With this, the computer 200 can feed back to the user 5 the fact that the computer 200 has recognized an event in which the user 5 is gazing at the object 1643 for movement.

As an example, when detecting that the object 1643 for movement has been gazed at by the user 5, the computer 200 causes a transmittance of the object 1643 for movement to become lower than a transmittance exhibited before the gazing. In at least one embodiment, the transmittance of the object 1643 for movement before being gazed at by the user 5 is set to 100%. In at least one embodiment, the transmittance of the object 1643 for movement before being gazed at by the user is set to more than 80%. This enables the computer 200 to prevent the user 5 from experiencing a loss of the sense of immersion in the virtual space 11, which is caused by the user 5 frequently visually recognizing the object 1643 for movement that does not exist in a movie theater in a real space. The computer 200 may be configured to gradually reduce the transmittance of the object 1643 for movement based on a time period for which the object 1643 for movement is being gazed at by the user 5.

A method of changing the display mode of the object 1643 for movement is not limited to the above-mentioned method. For example, the computer 200 may execute processing for changing a color of the object 1643 for movement, processing for changing a size of the object 1643 for movement, processing for causing the object 1643 for movement to blink, or other such processing.

In at least one embodiment, the object 1643 for movement has a height position (position in the Y direction) set lower than a height position of the initial position 12 at which the virtual camera 14 is arranged in the initial state. As an example, the height position of the object 1643 for movement is set at a position displaced from the height position of the initial position 12 by a distance defined in advance. This inhibits the object 1643 for movement from being included in the field of view of the user 5 unless the user 5 faces downward (in the Y direction) on purpose. This is because the user 5 normally faces forward. This configuration enables the computer 200 to prevent the user 5 from experiencing the loss of the sense of immersion in the virtual space 11, which is caused by the user 5 frequently visually recognizing the object 1643 for movement by accident.

Now, a description is given of an exemplary case in which the user 5 which wishes to move from the position of the seat object 1642-5 to the position of the seat object 1642-4. In this case, in order to visually recognize the seat object 1642-4 in the virtual space 11, the user 5 directs his or her head, on which the HMD 120 is worn, downward to the left in the real space. The computer 200 detects this motion of the user 5 based on output from the sensor 190 or the HMD 120. In response to this detection, the computer 200 changes the direction of the virtual camera 14 as in FIG. 18.

Figure 19:
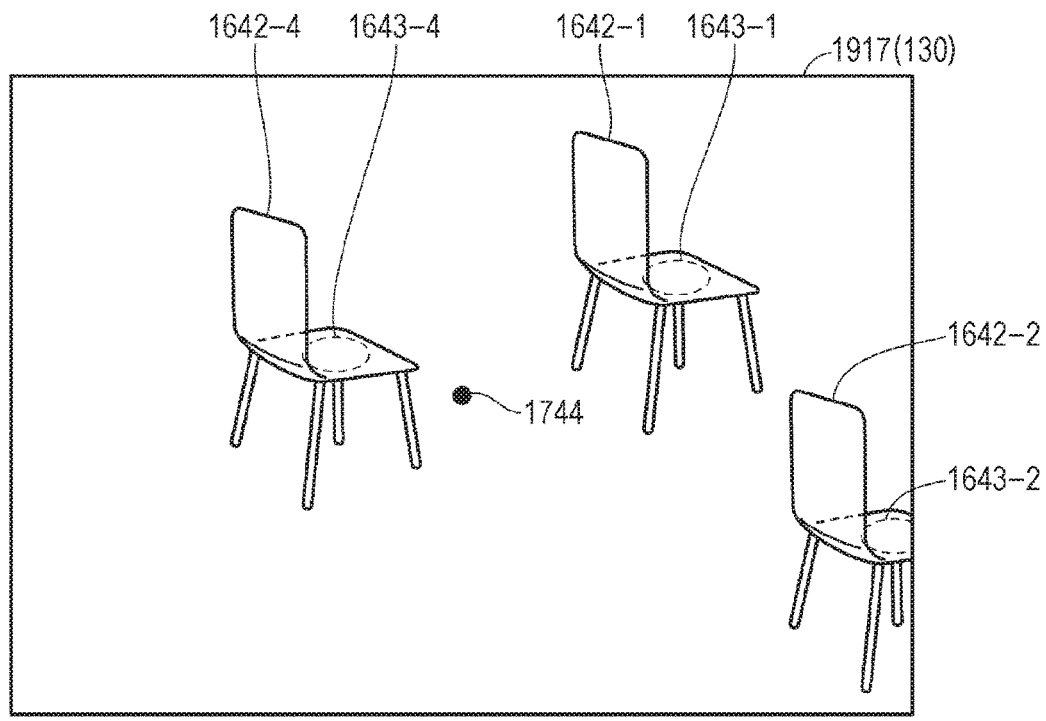
FIG. 19 A diagram of a field-of-view image in a state under which the user is not gazing at an object for movement according to at least one embodiment of this disclosure.

FIG. 19 is a diagram of a field-of-view image 1917 in a state under which the user 5 is not gazing at the object 1643-4 for movement according to at least one embodiment of this disclosure. In the field-of-view image 1917, the marker 1744 is not superimposed on the object 1643-4 for movement. Therefore, the computer 200 avoids detecting that the object 1643-4 for movement has been gazed at by the user 5. Under this state, the object 1643-4 for movement is transparent, and hence the user 5 is not able to visually recognizing this object.

Figure 20:
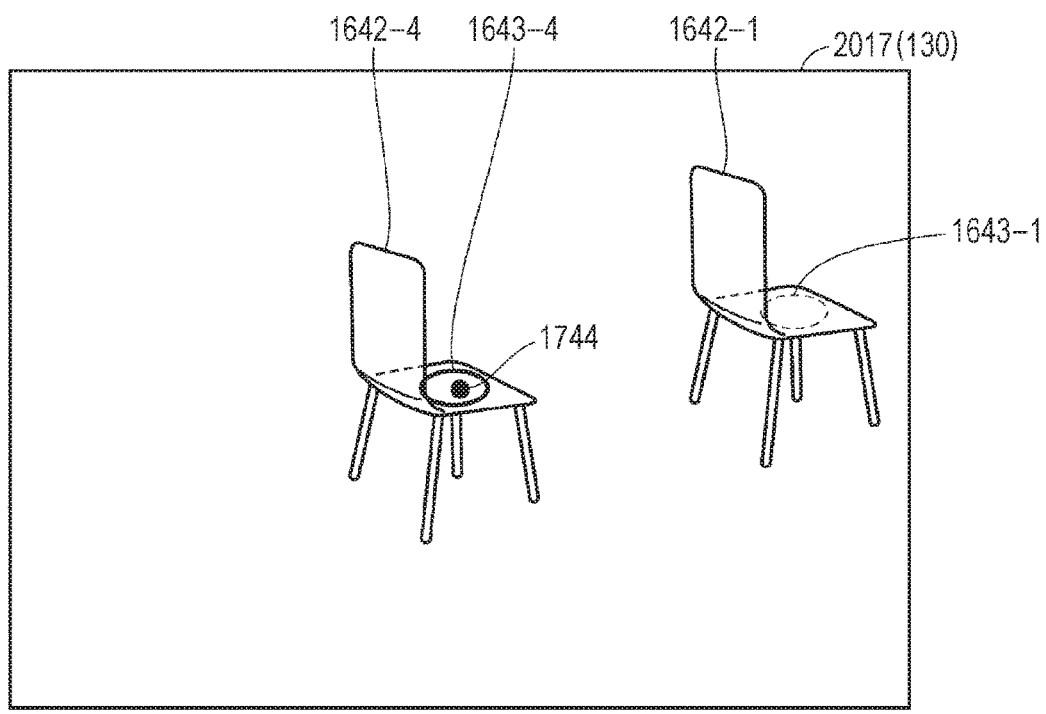
FIG. 20 A diagram of a field-of-view image in a state under which the user is gazing at the object for movement according to at least one embodiment of this disclosure.

FIG. 20 is a diagram of a field-of-view image 2017 in a state under which the user 5 is gazing at the object 1643-4 for movement according to at least one embodiment of this disclosure. In the field-of-view image 2017, the marker 1744 is superimposed on the object 1643-4 for movement. Therefore, the computer 200 detects that the object 1643-4 for movement has been gazed at by the user 5. Under this state, the transmittance of the object 1643-4 for movement is gradually reduced, and hence the user 5 visually recognizes the object 1643-4 for movement.

When detecting that the object 1643-4 for movement has been gazed at by the user 5 for a predetermined time period, the computer 200 moves the virtual camera 14 to a position corresponding to the object 1643-4 for movement. In at least one embodiment, the computer 200 moves the virtual camera 14 to a position displaced upward (in the Y direction) from the position of the object 1643 for movement by a distance defined in advance.

Figure 22:
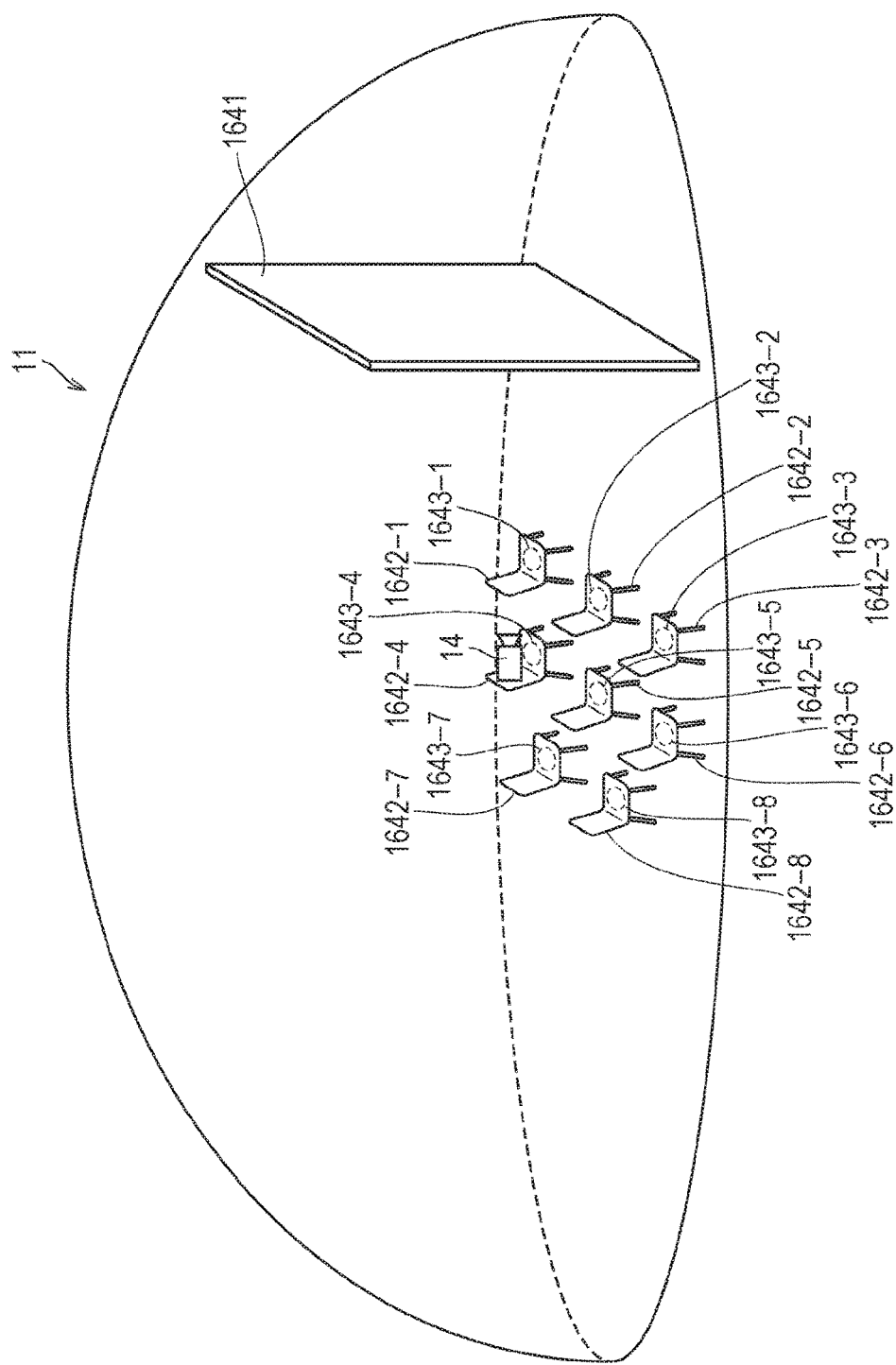
FIG. 22 A diagram of a meter object according to at least one embodiment of this disclosure.

FIG. 22 is diagram of a structure of the virtual space 11 obtained after the virtual camera 14 is moved according to at least one embodiment of this disclosure. In FIG. 22, the virtual camera 14 has moved to the position of the seat object 1642-4. This allows the user 5 to visually recognize the screen object 1641 from the position of the seat object 1642-4.

Figure 21:
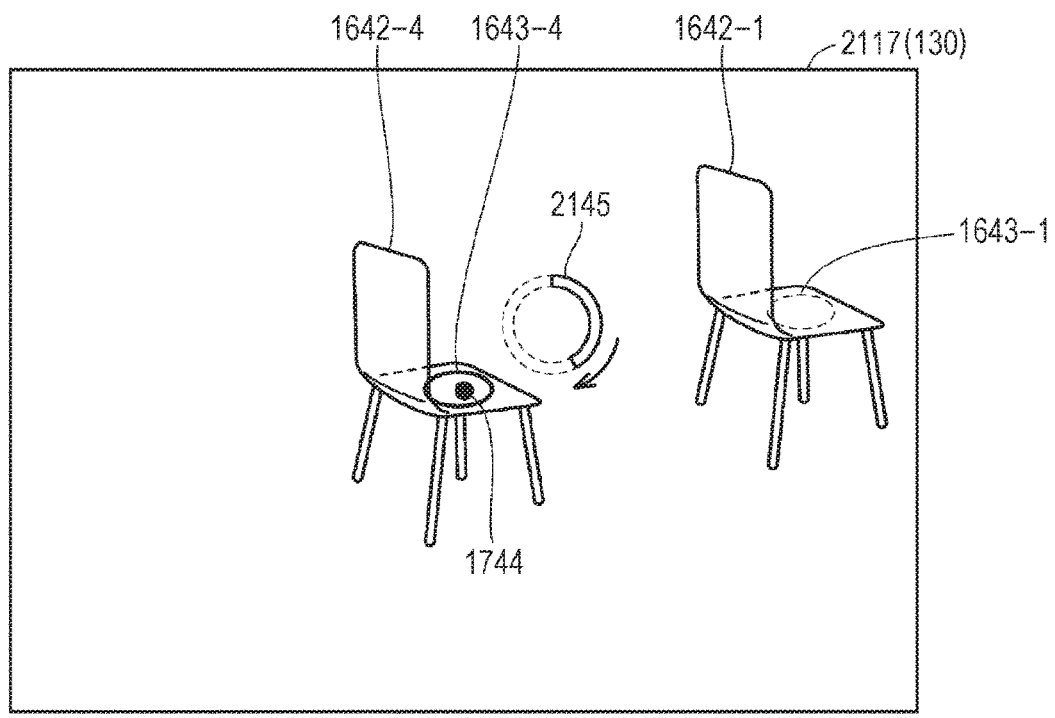
FIG. 21 A diagram of a structure of the virtual space obtained after the virtual camera is moved according to at least one embodiment of this disclosure.

FIG. 21 is a diagram of a meter object 2145 according to at least one embodiment of this disclosure. In FIG. 21, the object 1643-4 for movement is being gazed at by the user 5. The computer 200 detects this fact, and arranges the meter object 2145 near the object 1643-4 for movement. The meter object 2145 is configured to extend clockwise based on the time period for which the object 1643-4 for movement is being gazed at by the user 5. The meter object 2145 is configured to form a perfect circle when the time period for which the object 1643-4 for movement is being gazed at by the user 5 reaches a predetermined time period. This predetermined time period is set to be the same as a time period required for moving the virtual camera 14. This configuration allows the user 5 to intuitively understand a time period required until his or her own field of view (virtual camera 14) has been moved. In at least one aspect, the meter object 2145 is not limited to a circular shape, and has, for example, a bar shape.

[Control Structure]

Figure 23:
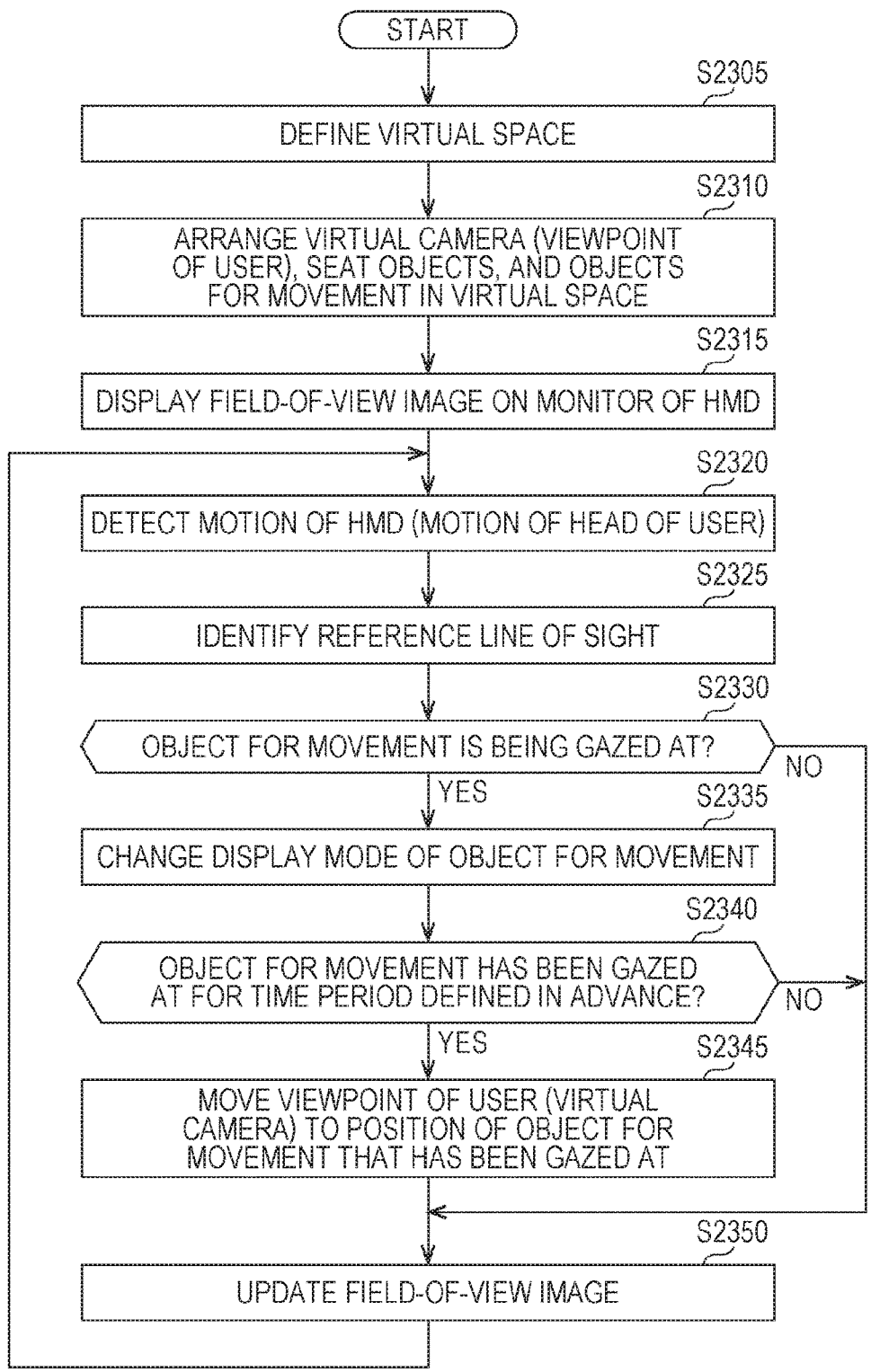
FIG. 23 A flowchart of processing to move the virtual camera through use of the object for movement according to at least one embodiment of this disclosure.

FIG. 23 is a flowchart of the above-mentioned series of processing performed to move the virtual camera 14 through use of the object 1643 for movement according to at least one embodiment of this disclosure. The processing in FIG. 23 may be implemented by the processor 210 of the computer 200 executing a control program stored in the memory 220 or the storage 230.

In Step S2305, the processor 210 serves as the virtual space definition module 1424 to define (create) the virtual space 11. In Step S2310, the processor 210 serves as the virtual object generation module 1425 to refer to the object information 1432 to arrange the virtual camera 14, the seat objects 1642, the objects 1643 for movement, and other objects at predetermined positions.

In Step S2315, the processor 210 serves as the field-of-view image generation module 1429 to output the field-of-view image data for displaying the field-of-view image 17 photographed by the virtual camera 14 to the monitor 130.

In Step S2320, the processor 210 serves as the reference-line-of-sight identification module 1423 to detect the motion (inclination) of the HMD 120 based on the output from the sensor 190 or the HMD sensor 410. The motion of the HMD 120 is linked to the motion of the head of the user 5. In Step S2325, the processor 210 serves as the reference-line-of-sight identification module 1423 to identify the reference line of sight 16 based on the detected motion of the HMD 120.

In Step S2330, the processor 210 determines whether or not the object 1643 for movement is being gazed at by the user 5. When the processor 210 determines that the object 1643 for movement is being gazed at by the user 5 (YES in Step S2330), the processor 210 advances the processing to Step S2335. Meanwhile, when the processor 210 determines that the object 1643 for movement is not being gazed at by the user 5 (NO in Step S2330), the processor 210 advances the processing to Step S2350.

In Step S2335, the processor 210 changes the display mode of the object 1643 for movement. As an example, the processor 210 reduces the transmittance of the object 1643 for movement by 1.7%. This allows the user 5 to visually recognize the object 1643 for movement. In at least one embodiment, the processor 210 is configured to repeatedly execute the processing of Steps S2320 to S2350 at an interval of 1/30 second. In this case, after the object 1643 for movement has been gazed at by the user 5 for two seconds, the transmittance of the object 1643 for movement becomes about 0%.

In Step S2340, the processor 210 determines whether or not the object 1643 for movement has been gazed at by the user 5 for over a time period (for example, two seconds) defined in advance. When the processor 210 determines that the object 1643 for movement has been gazed at by the user 5 for over the time period defined in advance (YES in Step S2340), the processor 210 advances the processing to Step S2345. Meanwhile, when the processor 210 determines that the object 1643 for movement has not been gazed at by the user 5 for over the time period defined in advance (NO in Step S2340), the processor 210 advances the processing to Step S2350.

In Step S2345, the processor 210 serves as the virtual camera control module 1421 to move the position of the virtual camera 14 (viewpoint of the user 5) to a position corresponding to the object 1643 for movement that has been gazed at.

In Step S2350, the processor 210 serves as the field-of-view image generation module 1429 to display the field-of-view image 17 photographed by the virtual camera 14 on the monitor 130.

According to the above description, the system 100 in at least one embodiment moves the viewpoint of the user 5 in the virtual space 11 in response to determination that the object 1643 for movement has been gazed at by the user 5. Therefore, the user 5 can easily move in the virtual space 11 without holding a controller to be operated by the hand.

[Avatar Object]

Figure 24:
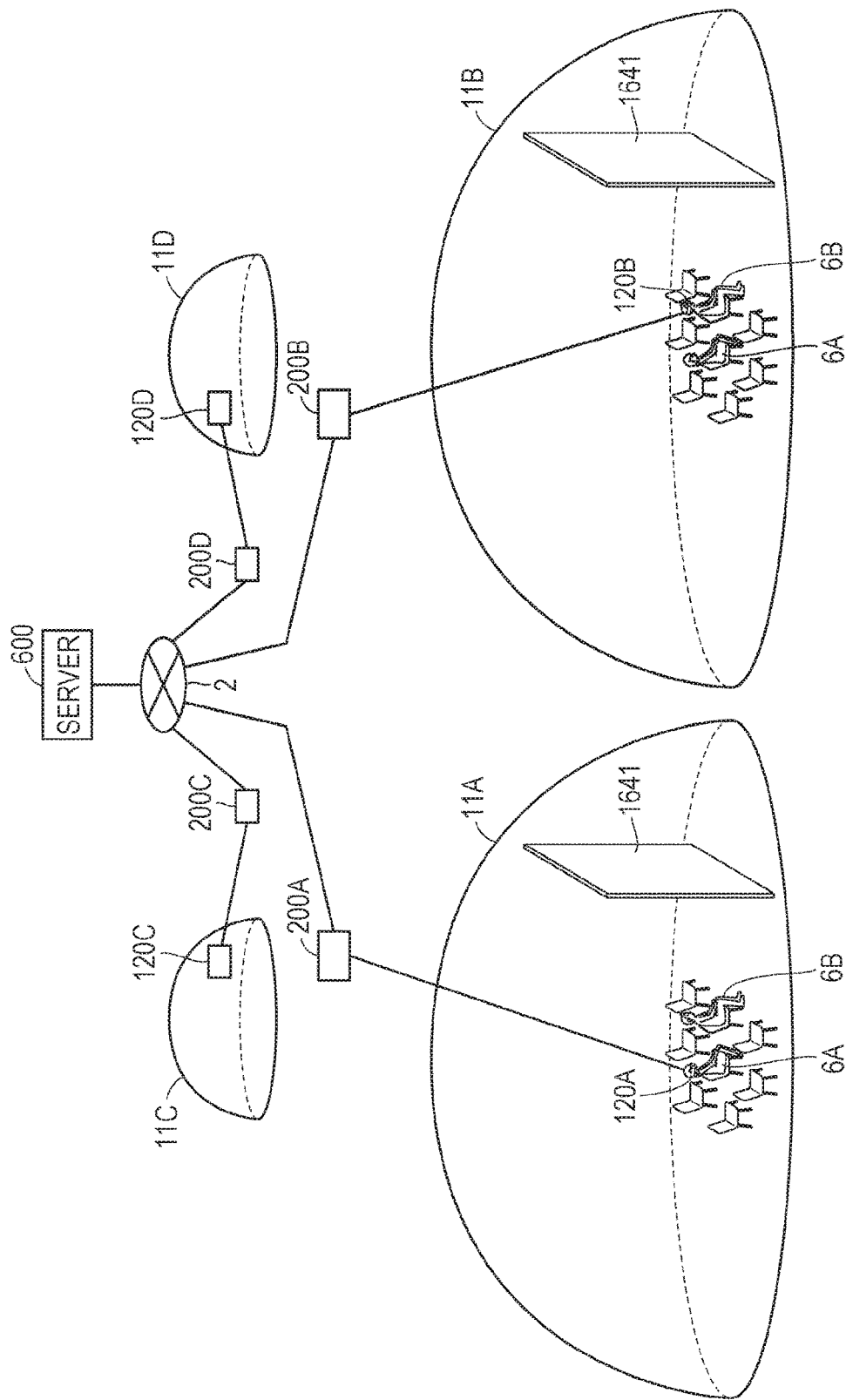
FIG. 24 A diagram of avatar objects of users according to at least one embodiment of this disclosure.

With reference to FIG. 24, an avatar object in at least one embodiment is described. FIG. 24 is diagram of avatar objects of respective users of the HMD sets 110A, 110B, 110C, and 110D according to at least one embodiment of this disclosure. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

In FIG. 24, the computers 200A to 200D provide the users 5A to 5D with the virtual spaces 11A to 11D via the HMDs 120A to 120D, respectively. In FIG. 24, the content reproduced in the virtual space 11A is the same as the content reproduced in the virtual space 11B. In other words, the computer 200A (user 5A) and the computer 200B (user 5B) share the same virtual space.

The user 5A and the user 5B who share the virtual space can communicate to/from each other in the virtual space. More specifically, the voice data on the user 5A acquired by the microphone 170A is transmitted to the HMD 120B of the user 5B via the server 600 and output from the speaker 180B provided to the HMD 120B. The voice data on the user 5B is transmitted to the HMD 120A of the user 5A via the server 600 and output from the speaker 180A provided to the HMD 120A. This allows the users 5A and 5B to communicate to/from each other via voice.

In the virtual space 11A and the virtual space 11B, the avatar object 6A of the user 5A and the avatar object 6B of the user 5B are arranged. In each virtual space, the motion of the user 5A (motion of the HMD 120A) is translated in the avatar object 6A, and the motion of the user 5B (motion of the HMD 120B) is translated in the avatar object 6B. More specifically, the computer 200A receives data representing the motion of the user 5B, which is acquired by a sensor 190B or an HMD sensor 410B, via the server 600. The computer 200A controls the motion of the avatar object 6B based on the received data. This allows the user 5A to recognize the motion of the user 5B through the avatar object 6B.

[Processing for Inhibiting Movement]

Figure 25:
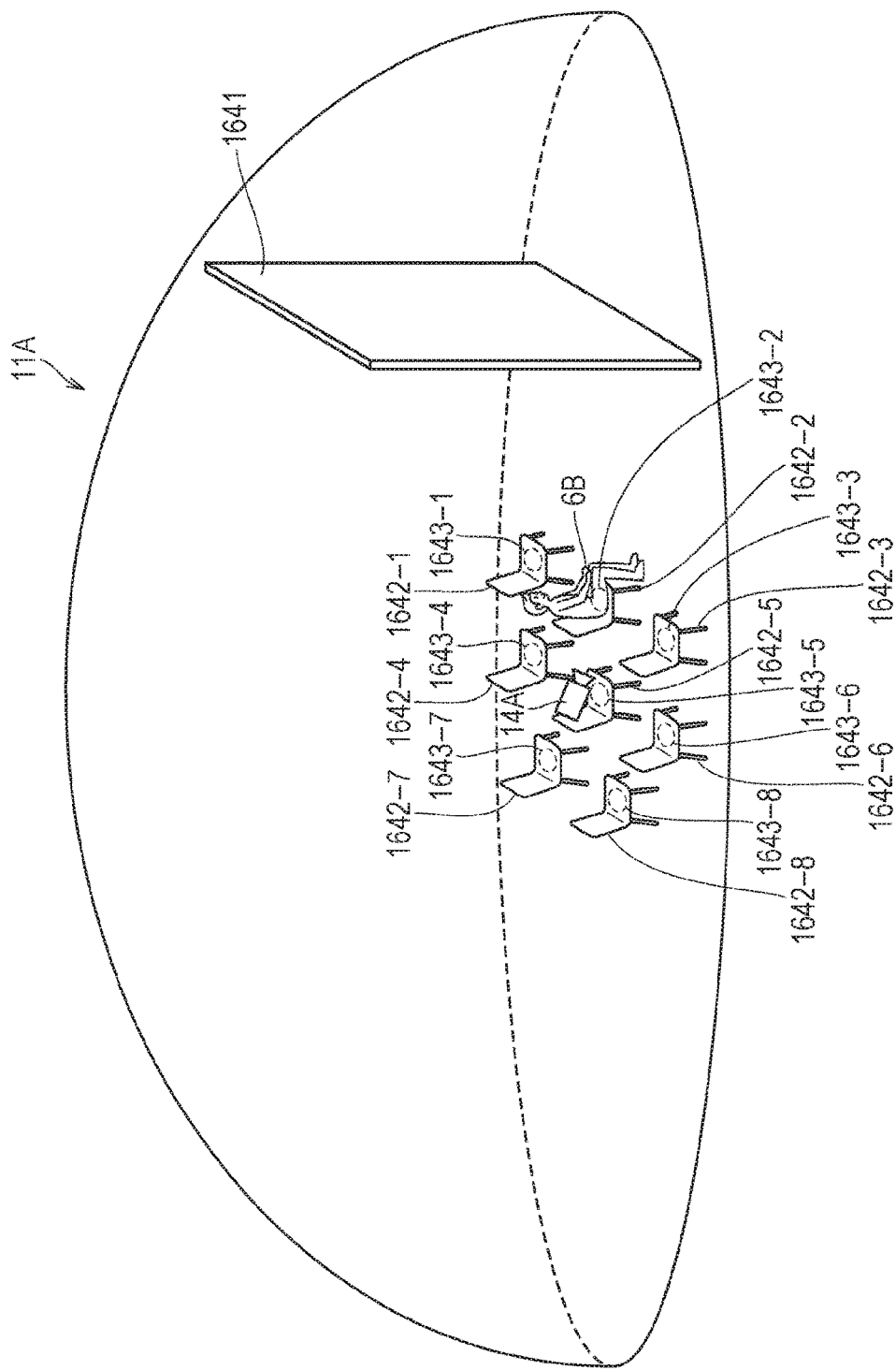
FIG. 25 A diagram of a structure of a virtual space in at least one embodiment of this disclosure.
Figure 26:
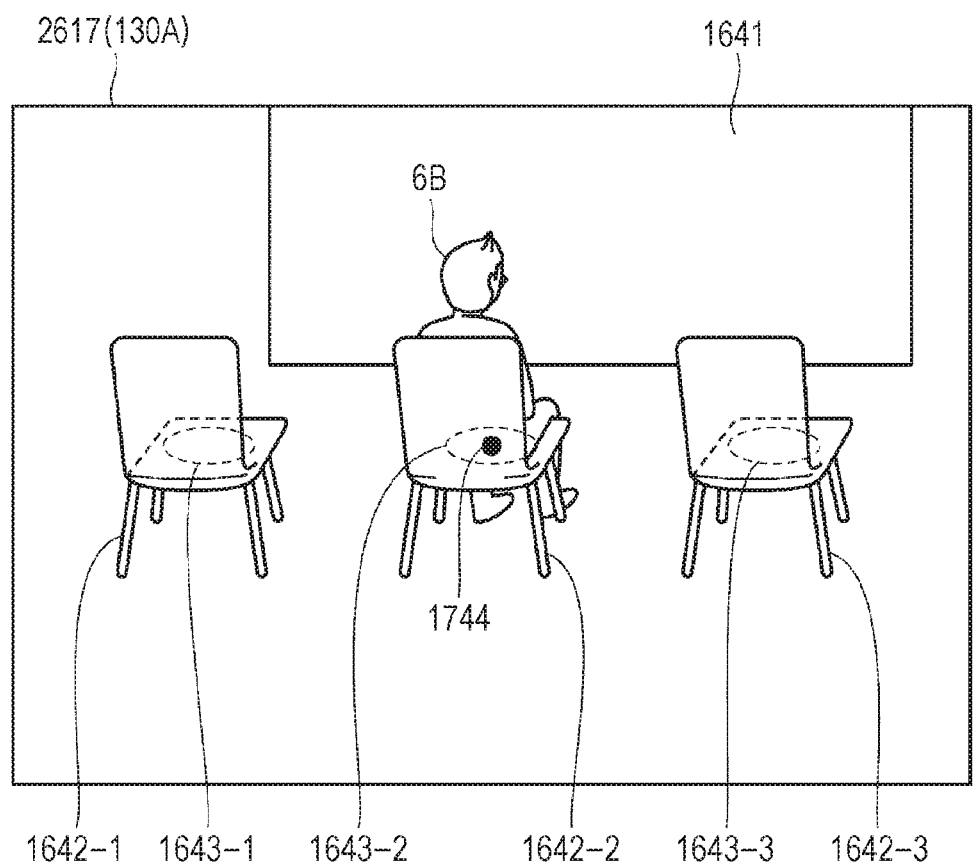
FIG. 26 A diagram of a field-of-view image of the user according to at least one embodiment of this disclosure.
Figure 27:
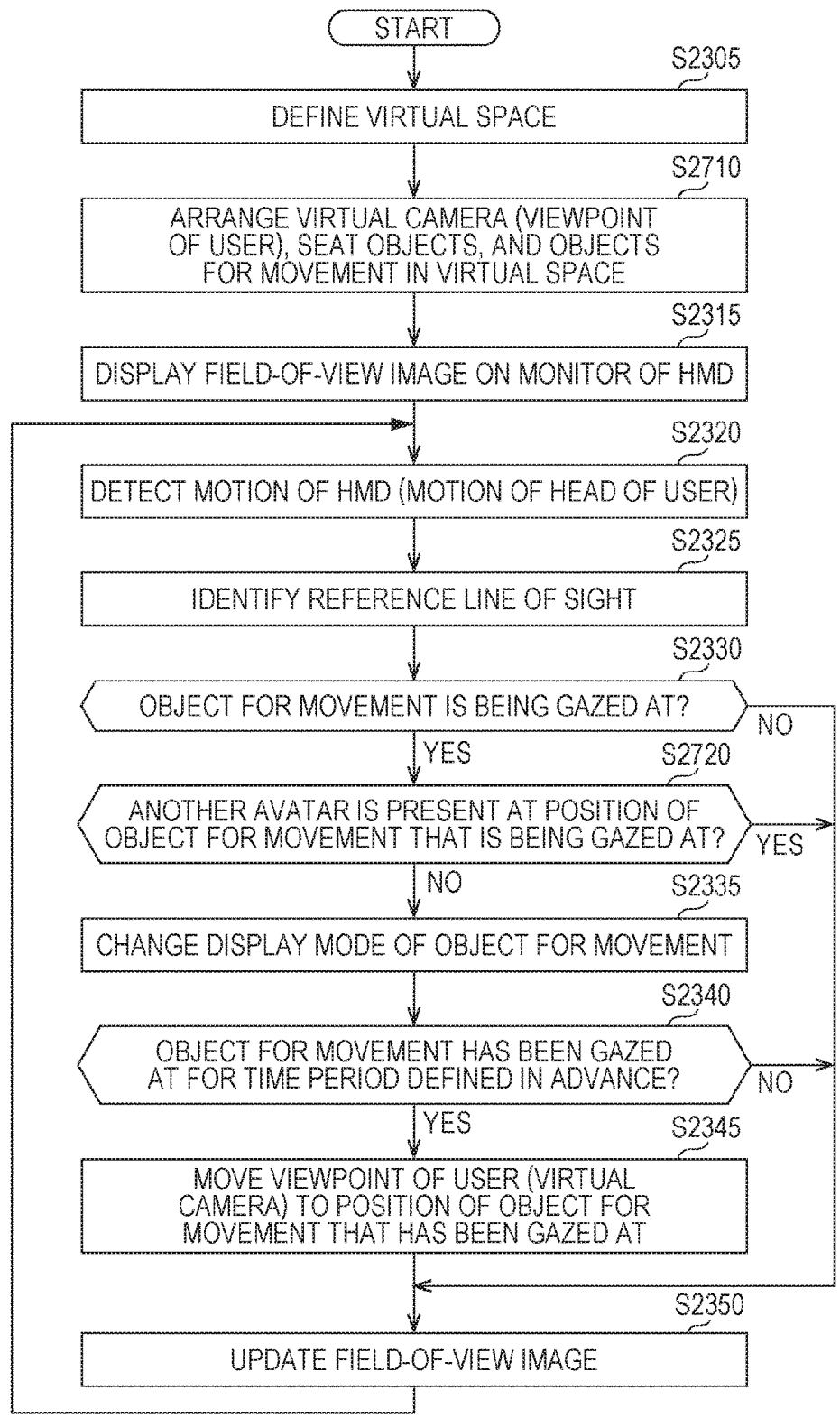
FIG. 27 A flowchart of processing performed to cancel moving processing according to at least one embodiment of this disclosure.

Next, with reference to FIG. 25 to FIG. 27, a description is given of a case in which the movement is not executed even when the object 1643 for movement has been gazed at by the user 5.

FIG. 25 is a diagram of the virtual space 11A in at least one aspect. In the virtual space 11A in FIG. 25, the avatar object 6B is seated on the seat object 1642-2. The avatar object 6A is seated on the seat object 1642-5.

In at least one aspect, a virtual camera control module 1421A arranges the virtual camera 14A (not shown) for photographing the field-of-view image 17A of the user 5A at the position of the face (eyes) of the avatar object 6A.

FIG. 26 is diagram of a field-of-view image 2100 of the user 5A corresponding to FIG. 25 according to at least one embodiment of this disclosure. In the field-of-view image 2617, the marker 1744 is superimposed on the object 1643-2 for movement. However, the computer 200A avoids moving the viewpoint of the user 5A (virtual camera 14A arranged in the face of the avatar object 6A) to a position corresponding to the seat object 1642-2. This is because the avatar object 6B is already arranged on the seat object 1642-2. More specifically, when the avatar objects 6A and 6B are arranged on the seat object 1642-2, a distance between the avatar objects becomes extremely short, and hence the users 5A and 5B will have difficulty communicating to/from each other. Another reason is to prevent a third party (for example, user 5C) from feeling a sense of strangeness by viewing a state in which there is an overlap between the avatar objects 6A and 6B.

The computer 200A may be configured to avoid changing the display mode of the object 1643-2 for movement even in response to a detection that the object 1643-2 for movement has been gazed at by the user 5A in the above-mentioned case. As an example, in FIG. 26, the computer 200A avoids reducing the transmittance of the object 1643-2 for movement even when the marker 1744 is superimposed on the object 1643-2 for movement. According to this configuration, the user 5 cannot visually recognize the object 1643-2 for movement in the first place, and is therefore prevented from erroneously recognizing this object as a moving destination.

FIG. 27 is a flowchart of the processing for canceling moving processing according to at least one embodiment of this disclosure. In FIG. 27, the same processing steps as the above-mentioned processing steps are denoted by the same reference symbols. Therefore, descriptions of those processing steps are not repeated.

In Step S2710, the processor 210 arranges the avatar object 6 as well as the virtual camera 14, the seat object 1642, and the object 1643 for movement in the virtual space 11.

In Step S2330, when the processor 210 determines that the object 1643 for movement is being gazed at by the user 5 (YES in Step S2330), the processor 210 advances the processing to Step S2720.

In Step S2720, the processor 210 determines whether or not the avatar object 6 is present at the position of the object 1643 for movement that is being gazed at. A specific example of this processing is described. When the avatar object 6B (virtual camera 14B) moves in the virtual space 11B through the operation of the user 5B, information representing the moving destination is transmitted from the computer 200B to the computer 200A via the server 600. With this, the computer 200A moves the avatar object 6B in the virtual space 11. In this manner, the computer 200A can grasp the position of the avatar object 6B. This enables the computer 200A to grasp which one of the seat objects 1642 the avatar object 6B is seated on.

When the processor 210 determines that the avatar object 6 is present at the position of the object 1643 for movement that is being gazed at (YES in Step S2720), the processor 210 advances the processing to Step S2350. In this case, the processor 210 inhibits (omits) the processing of Step S2335 (processing for changing the display mode of the object 1643 for movement) and the processing of Step S2345 (processing for moving the viewpoint of the user).

Meanwhile, when the processor 210 determines that the avatar object 6 is not present at the position of the object 1643 for movement that is being gazed at (NO in Step S2720), the processor 210 advances the processing to Step S2335.

According to the above description, the system 100 prevents the viewpoints of two or more users (avatar objects) from being arranged at substantially the same position in the virtual space, to thereby inhibit the distance between the avatar objects from becoming extremely short. As a result, the system 100 may encourage the users to perform smoother communication in the virtual space.

[Other Configurations]

(Processing for Further Clarifying Moving Destination)

Figure 28:
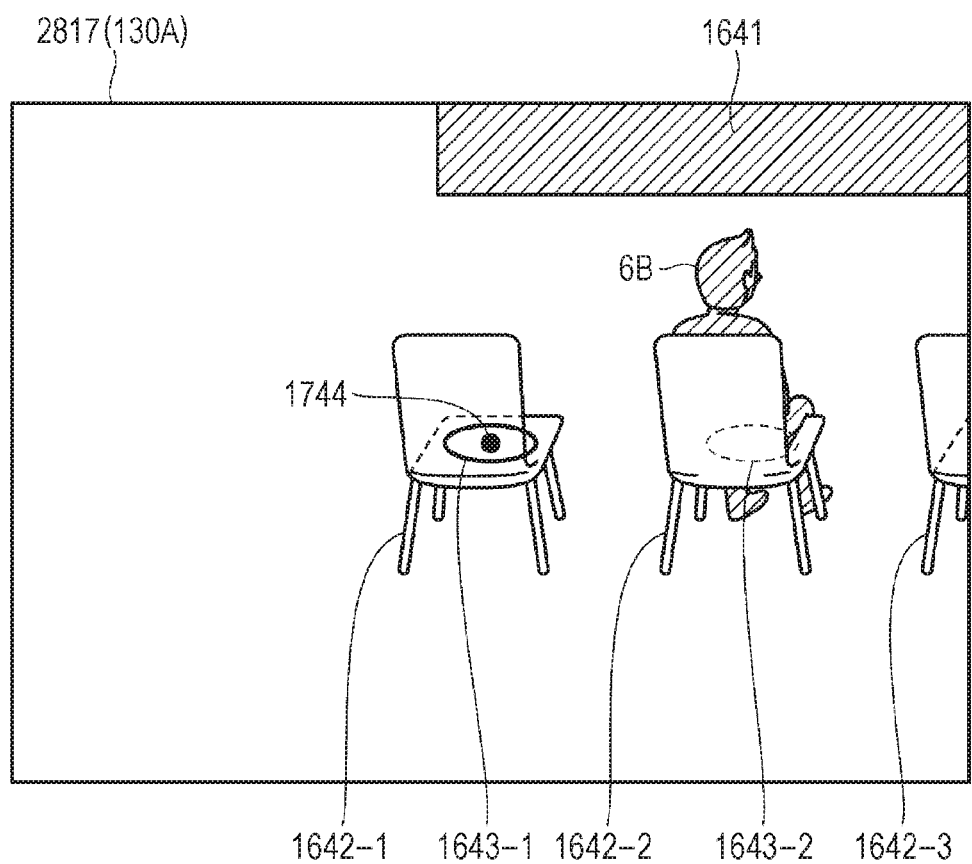
FIG. 28 A diagram of a field-of-view image of the user in at least one embodiment of this disclosure.

FIG. 28 is a diagram of a field-of-view image 2817 of the user 5A in at least one aspect. In the field-of-view image 2817, the marker 1744 is superimposed on the object 1643-1 for movement. Therefore, the object 1643-1 for movement is visualized.

In at least one embodiment, the computer 200A reduces a brightness value of an object other than the object 1643 for movement among the objects arranged in the virtual space 11A while the object 1643 for movement is being gazed at. As an example, in FIG. 28, the computer 200A may reduce the brightness values of the avatar object 6B and the screen object 1641 by a ratio (for example, 50%) defined in advance. In at least one aspect, the computer 200A is configured to reduce only the brightness value of content being reproduced on the screen object 1641 instead of the brightness value of the entire screen object 1641.

When the brightness values of the screen object 1641 and the avatar object 6B are reduced, the user 5A feels that the object 1643 for movement that is being gazed at by the user 5A is emphasized. Therefore, the user 5A is able to visually recognize the object 1643 for movement easily. Therefore, the user 5A can more easily select a moving candidate destination in the virtual space 11A.

(Processing for Explicitly Indicating Plurality of Moving Destinations)

Figure 29:
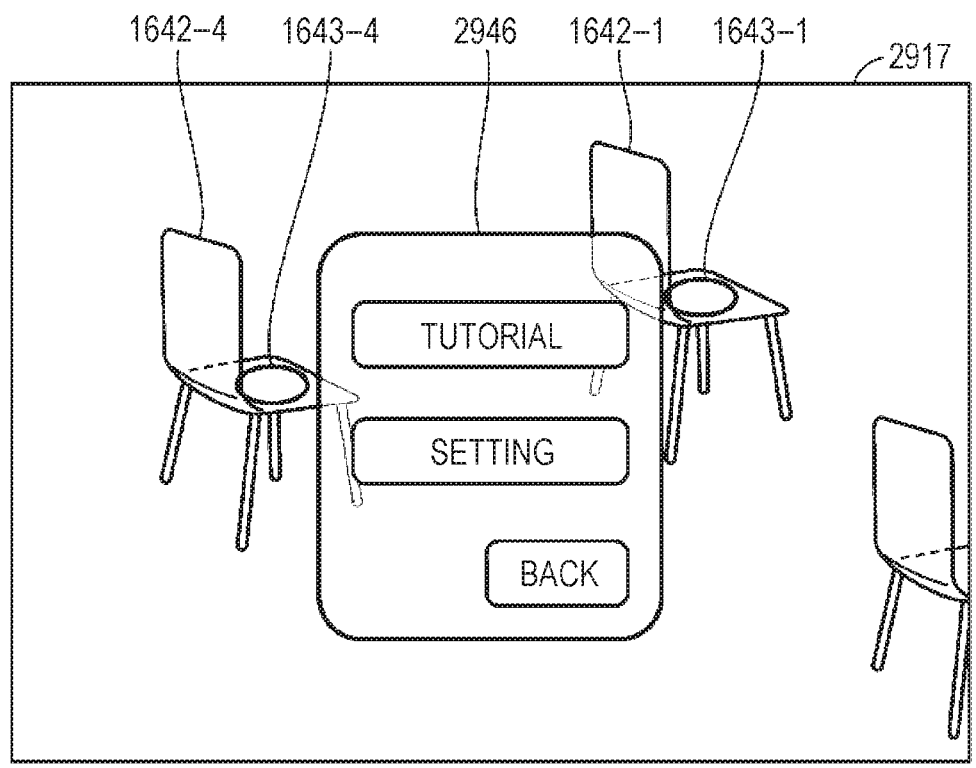
FIG. 29 A diagram of a field-of-view image of the user in at least one embodiment of this disclosure.

FIG. 29 is a diagram of a field-of-view image 2917 of the user 5 in at least one aspect. The field-of-view image 2917 includes a menu object 2946 in addition to the seat object 1642 and the object 1643 for movement.

In at least one aspect, the user 5 views the menu object 2946 in order to, for example, change settings of the HMD 120. For example, the computer 200 arranges the menu object 2946 in the virtual space 11 when detecting through use of the eye gaze sensor 140 that the user 5 has blinked continuously.

With reference to FIG. 29, the computer 200 in at least one embodiment changes the display mode of all the objects 1643 for movement included in the field of view of the user 5 and maintains the changed display mode (for example, reduces the transmittance of the objects 1643 for movement and maintains the reduced transmittance) while the menu object 2946 is arranged in the virtual space 11. This is because, while the menu object 2946 is displayed, the user 5 does not focus on content being displayed on the screen object 1641 or on communication to/from another user, and even a change of the display mode of the objects 1643 for movement does not bother the user 5. The user 5 can visually recognize all the objects 1643 for movement included in the field of view, and can therefore grasp the position of the object 1643 for movement being a moving candidate.

In at least one aspect, the computer 200 is configured to change the display mode of the all objects 1643 for movement included in the field of view of the user 5 while the user 5 is facing downward. The height (position in the Y direction) of the line of sight of the user 5 is normally aligned with a substantially horizontal direction (with respect to an XZ plane) in order to view the screen object 1641 or to communicate to/from another user. Therefore, even when being changed while the user 5 is facing downward, the display mode of the objects 1643 for movement does not bother the user 5.

The computer 200 may determine that the user 5 is facing downward when, for example, an angular displacement about a pitch axis with respect to an initial angle exceeds a threshold value (for example, 30 degrees) based on an angular velocity about the pitch axis, which is detected by the sensor 190. The computer 200 may set, as the initial angle, a pitch angle acquired from the angular velocity sensor 190 when the user 5 wearing the HMD 120 is observing a point in the horizontal direction.

The computer 200 may acquire the angular velocity about the pitch axis of the HMD 120 through use of the HMD sensor 410. In this case, the computer 200 can detect a horizontal state of the HMD 120 based on the output from the HMD sensor 410. Therefore, the computer 200 may set the pitch angle of the HMD 120 in the horizontal state as the initial angle.

(Method of Detecting that Object for Movement is being Gazed at by User)

In the above-mentioned example, the computer 200 is configured to handle the center (marker 1744) of the field of view of the user 5 as the line of sight of the user 5. In at least one aspect, the computer 200 determines that the object 1643 for movement is being gazed at by the user 5 based on the fact that the line of sight of the user 5 detected by the eye gaze sensor 140 is directed toward the object 1643 for movement.

In this case, the marker 1744 is not fixed at the center of the field-of-view image, and moves in the field-of-view image based on the line of sight of the user 5 detected by the eye gaze sensor 140. According to this configuration, the computer 200 is able to more accurately detect that the user 5 is gazing at the object 1643 for movement.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

It is to be understood that the embodiments disclosed herein are merely examples in all aspects and in no way intended to limit this disclosure. The scope of this disclosure is defined by the appended claims and not by the above description, and one of ordinary skill in the art would understand that this disclosure encompasses all modifications made within the scope and spirit equivalent to those of the appended claims.

What is claimed is:

1. A method, comprising:
defining a virtual space, wherein the virtual space comprises a virtual point of view associated with a first user, a first object, an avatar representing a second user, and a second object;
detecting a motion of a head of the first user;
defining a field of view in the virtual space based on a position of the virtual point of view and the detected motion;
generating a field-of-view image corresponding to the field of view;
displaying the first object in a first mode;
displaying the second object in a second mode;
detecting a position of gaze of the first user in the field of view;
detecting contact between the position of gaze and the first object;
displaying the first object or the second object in a third mode in response to detection of the contact;
moving the position of the virtual point of view to a position corresponding to the first object in response to detection of the contact;
detecting whether the avatar is arranged at the position corresponding to the first object; and
inhibiting, in response to detection that the avatar is arranged at the position corresponding to the first object, the position of the virtual point of view from being moved to the position corresponding to the first object.

2. The method according to claim 1,
wherein the detecting of the contact comprises:
detecting whether a time period for which the contact is being maintained has exceeded a first duration, and
the moving of the position of the virtual point of view in the virtual space to the position corresponding to the first object comprises moving the virtual point of view in response to detection that the time period for which the contact is being maintained has exceeded the first duration.

3. The method according to claim 1, further comprising:
identifying a reference line of sight of the first user in the virtual space;
defining the field of view so that the reference line of sight is positioned at a center of the field-of-view image; and
arranging the position of gaze on the reference line of sight.

4. The method according to claim 1, further comprising:
detecting a line of sight of the first user in a real space;
identifying a line of sight in the virtual space which corresponds to the line of sight in the real space; and
arranging the position of gaze on the corresponding line of sight.

5. The method according to claim 1,
wherein the first object or the second object is arranged at a position lower than the position of the virtual point of view in a height direction.

6. The method according to claim 1,
wherein the first mode involves displaying the first object with a first transmittance, and wherein the third mode involves displaying the first object with a second transmittance lower than the first transmittance.

7. The method according to claim 1,
displaying the first object in the second mode in response to both detection that the avatar is not arranged at the position corresponding to the first object and detection of the contact; and
continuing to display the first object in the first mode in response to both detection that the avatar is arranged at the position corresponding to the first object and detection of the contact.

8. The method according to claim 1, further comprising continuing to display the first object in the first mode and displaying the second object in the third mode in response to detection of the contact.

9. The method according to claim 1, wherein the virtual space further comprises an avatar representing a second user and a display object for displaying a moving image.

10. The method according to claim 1, further comprising:
arranging a menu object in the virtual space in response to input from the first user;
controlling the virtual space based on the input performed on the menu object by the first user; and
displaying at least one of the first object or the second object in a fourth mode while the menu object is arranged in the virtual space.

11. The method according to claim 10, further comprising:
clearing the menu object from the virtual space; and
displaying the first object in the first mode in response to clearing the menu object from the virtual space.

12. The method according to claim 1, further comprising arranging a seat object in the virtual space,
wherein the seat object comprises a seat surface, and
wherein the first object is arranged on the seat surface.

13. A system, comprising:
a non-transitory computer readable medium configured to store instructions thereon; and
a processor connected to the non-transitory computer readable medium, wherein the processor is configured to execute the instructions for:
defining a virtual space, wherein the virtual space comprises a virtual point of view associated with a first user, a first object, an avatar representing a second user, and a second object;
detecting a motion of a head of the first user;
defining a field of view in the virtual space based on a position of the virtual point of view and the detected motion;
generating a field-of-view image corresponding to the field of view;
instructing a head-mounted display (HMD) to display the first object in a first mode;
instructing the HMD to display the second object in a second mode;
detecting a position of gaze of the first user in the field of view;
detecting contact between the position of gaze and the first object;
instructing the HMD to display the first object or the second object in a third mode in response to detection of the contact;
moving the position of the virtual point of view to a position corresponding to the first object in response to detection of the contact;
detecting whether the avatar is arranged at the position corresponding to the first object; and
inhibiting, in response to detection that the avatar is arranged at the position corresponding to the first object, the position of the virtual point of view from being moved to the position corresponding to the first object.

14. The system according to claim 13,
wherein the processor is further configured to execute the instructions for:
detecting whether a time period for which the contact is being maintained has exceeded a first duration, and
moving of the position of the virtual point of view in the virtual space to the position corresponding to the first object in response to detection that the time period for which the contact is being maintained has exceeded the first duration.

15. The system according to claim 13, wherein the processor is further configured to execute the instructions for:
identifying a reference line of sight of the first user in the virtual space;
defining the field of view so that the reference line of sight is positioned at a center of the field-of-view image; and
arranging the position of gaze on the reference line of sight.

16. The system according to claim 13, wherein the processor is further configured to execute the instructions for:
detecting a line of sight of the first user in a real space;
identifying a line of sight in the virtual space which corresponds to the line of sight in the real space; and
arranging the position of gaze on the corresponding line of sight.

17. The system according to claim 13,
wherein the first object or the second object is arranged at a position lower than the position of the virtual point of view in a height direction.

18. The system according to claim 13,
wherein the first mode involves displaying the first object with a first transmittance, and
wherein the third mode involves displaying the first object with a second transmittance lower than the first transmittance.

19. A method, comprising:
defining a virtual space, wherein the virtual space comprises a virtual point of view associated with a first user, an avatar representing a second user, and a plurality of objects;
defining a field of view in the virtual space based on a position of the virtual point of view;
detecting a line of sight of the first user in the field of view;
detecting contact between the line of sight and a first object of the plurality of objects;
changing a transmittance of at least one object of the plurality of objects in response to the detection of the contact;
moving the position of the virtual point of view to a position corresponding to the first object in response to a duration of the detection of the contact exceeding a threshold value;
detecting whether the avatar is arranged at the position corresponding to the first object; and
inhibiting, in response to detection that the avatar is arranged at the position corresponding to the first object, the position of the virtual point of view from being moved to the position corresponding to the first object.

20. The method according to claim 19, further comprising:
   displaying the first object in a first transmittance in response to both detection that the avatar is not arranged at the position corresponding to the first object and detection of the contact; and
   continuing to display the first object in a second transmittance in response to both detection that the avatar is arranged at the position corresponding to the first object and detection of the contact.

* * * * *